United States Patent [19]

Onda et al.

[11] Patent Number: 4,791,588

[45] Date of Patent: Dec. 13, 1988

[54] MOVABLE APPARATUS DRIVING SYSTEM

[75] Inventors: Nobuhiko Onda; Kazuo Asakawa; Tadashi Akita, all of Kawasaki; Hitoshi Komoriya, Machida; Toru Kamada, Yokohama, all of Japan

[73] Assignee: Fujitsu Limited, Kawasaki, Japan

[21] Appl. No.: 78,008

[22] Filed: Jul. 24, 1987

Related U.S. Application Data

[63] Continuation of Ser. No. 708,545, Mar. 5, 1985, abandoned.

[30] Foreign Application Priority Data

| Mar. 9, 1984 | [JP] | Japan | 59-45045 |
| Aug. 9, 1984 | [JP] | Japan | 59-166995 |
| Dec. 11, 1984 | [JP] | Japan | 59-261482 |

[51] Int. Cl.$^4$ ............................................. G05B 13/00
[52] U.S. Cl. ..................................... 364/513; 901/9; 901/34; 901/45; 901/47
[58] Field of Search ................ 364/513, 165; 318/568; 901/9, 10, 33, 34, 45-47

[56] References Cited

U.S. PATENT DOCUMENTS

| 3,824,674 | 7/1974 | Inoyama | 901/45 |
| 4,001,556 | 1/1977 | Folchi | 364/513 |
| 4,024,959 | 5/1977 | Gruner | 901/34 |
| 4,132,318 | 1/1979 | Wang | 364/513 |
| 4,166,543 | 9/1979 | Dahlstrom | 901/9 |
| 4,243,923 | 1/1981 | Whitney | 364/513 |
| 4,408,286 | 10/1983 | Kikuchi | 364/513 |
| 4,439,926 | 4/1984 | Whitney | 901/45 |
| 4,447,048 | 5/1984 | Fischer | 901/45 |
| 4,458,321 | 6/1984 | Whitney | 364/513 |
| 4,562,551 | 12/1985 | Inaba | 364/513 |
| 4,571,694 | 2/1986 | Inaba | 364/513 |
| 4,603,284 | 7/1986 | Perzley | 364/513 |
| 4,616,326 | 10/1986 | Meier et al. | 364/513 |
| 4,621,332 | 11/1986 | Sugimoto et al. | 364/513 |

Primary Examiner—Jerry Smith
Assistant Examiner—Allen MacDonald
Attorney, Agent, or Firm—Staas & Halsey

[57] ABSTRACT

A movable apparatus drive system comprises a driving device for the movable apparatus, a first output device for detecting environmental information around the movable apparatus and for outputting a corresponding signal in response to the environmental information data, a second output device for outputting a command signal to drive the driving device so as to move the movable apparatus to a target position, based on target position data of the movable apparatus to be moved and current position data of the movable apparatus; and a supply device for supplying a composite signal constituted by the environmental information data and the command signal.

Moreover, a robot control system comprises a control device for controlling the motion of a robot in response to a command signal to the robot; a spring mechanism provided at a working point of the robot for detecting a deflection (displacement) caused by an external force applied to the robot; and a feedback means for feeding back a deflection feedback value obtained by multiplying detected output of the spring meachnism by a predetermined gain. The control device controls the motion of the robot in response to the addition of a position command generated from the control means and the deflection feedback value.

33 Claims, 39 Drawing Sheets

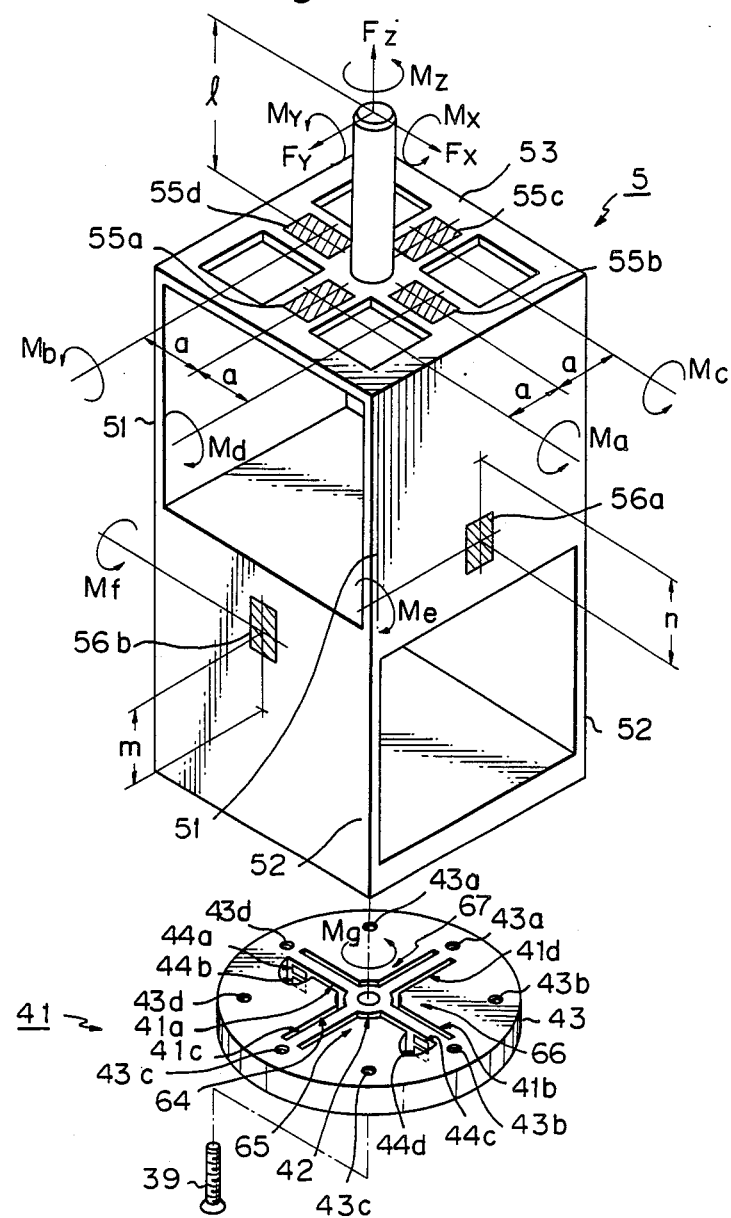

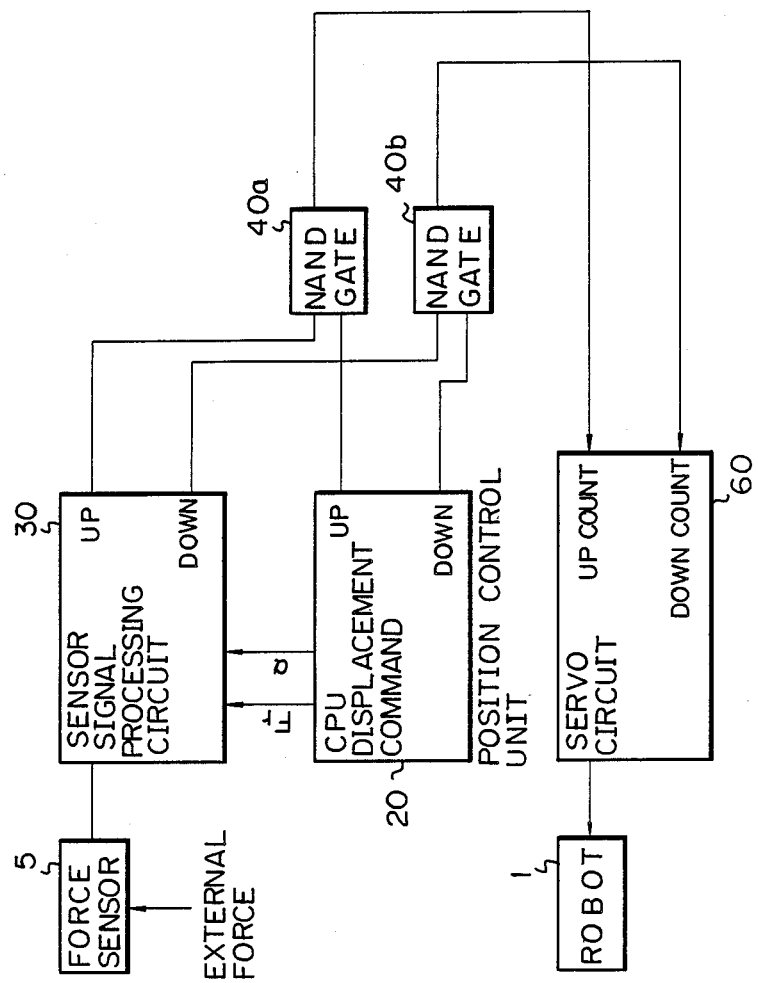

Fig. 16

| ITEM | COMMAND | DATA |
|---|---|---|
| 1 | 'STORE' | ⓐ (x.y.z) |
| 2 | " | ⓑ (x.y.z) |
| 3 | " | ⓒ (x.y.z) |
| 4 | 'HAND CLOSE' | |
| 5 | 'STORE' | ⓓ (x.y.z) |
| 6 | " | ⓔ (x.y.z) |
| 7 | " | ⓕ (x.y.z) |
| 8 | 'HAND OPEN' | |
| 9 | 'STORE' | ⓖ (x.y.z) |
| 10 | " | ⓗ (x.y.z) |
| 11 | | |
| 12 | | |

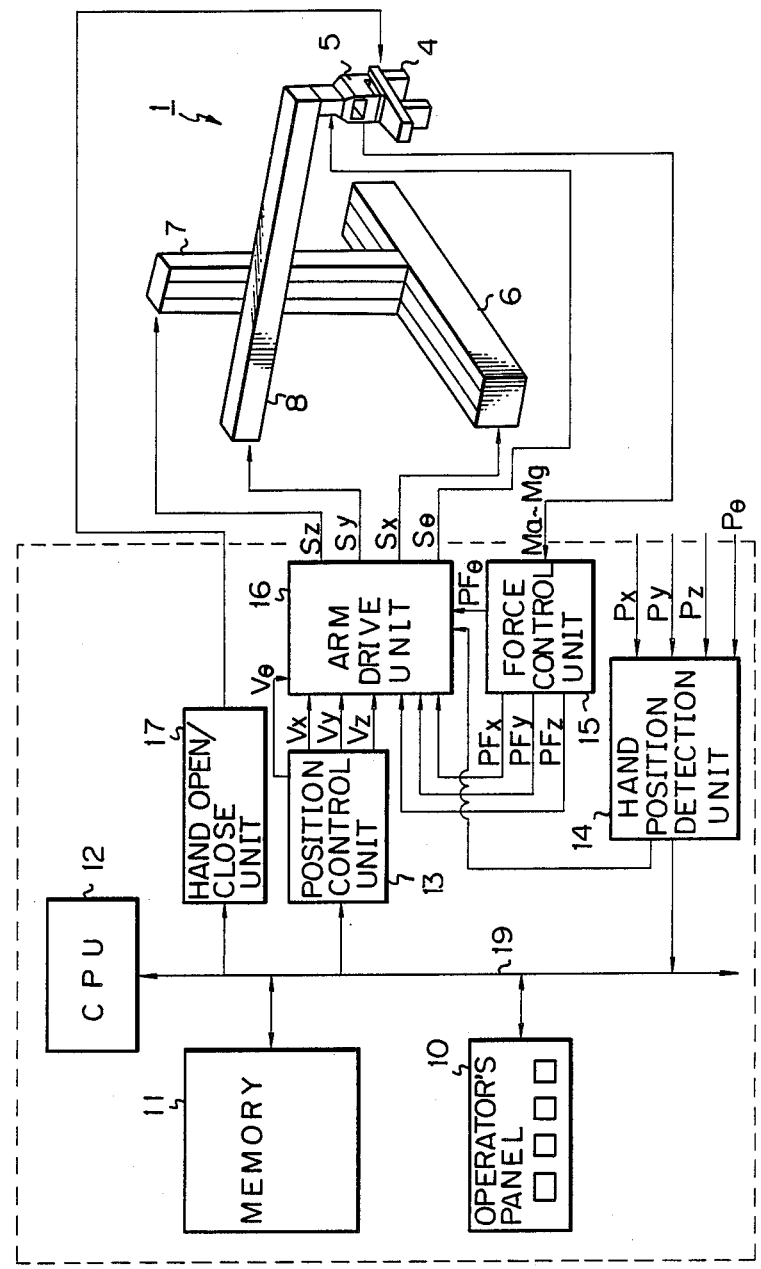

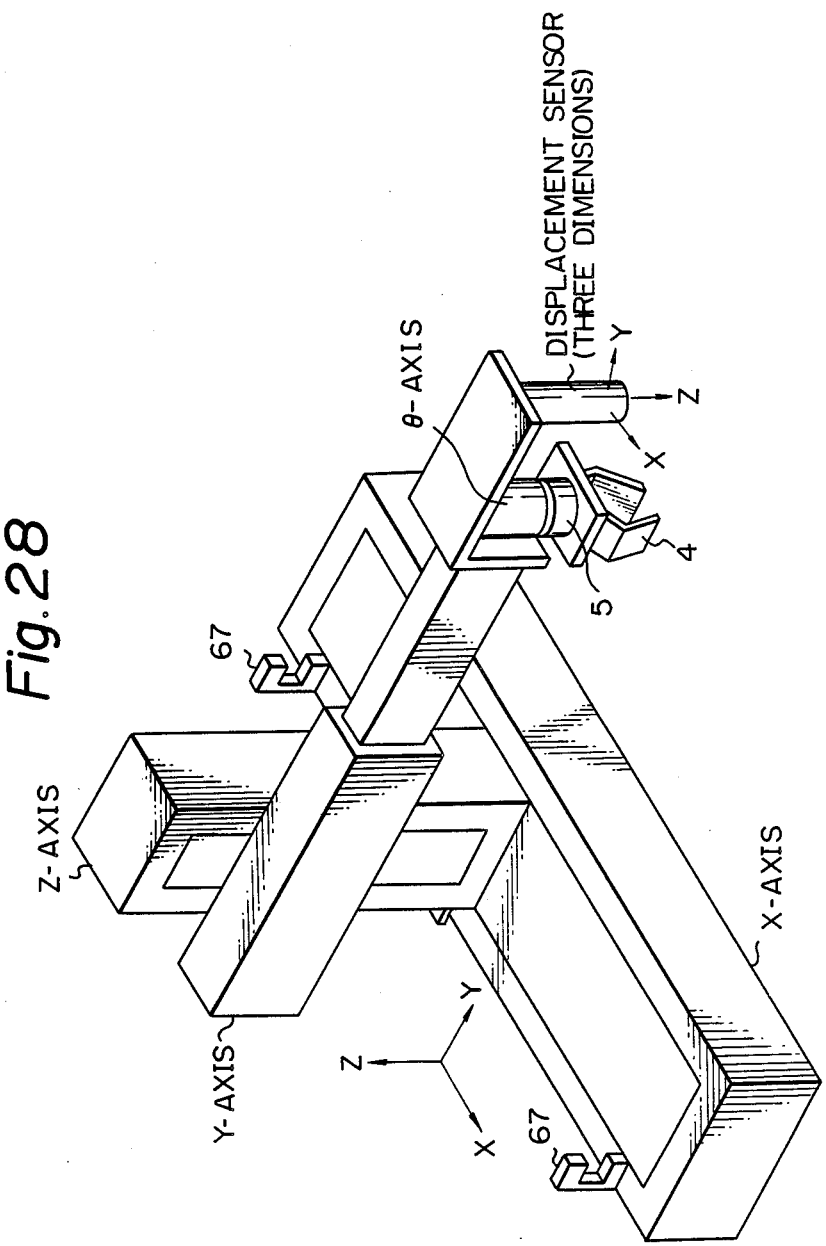

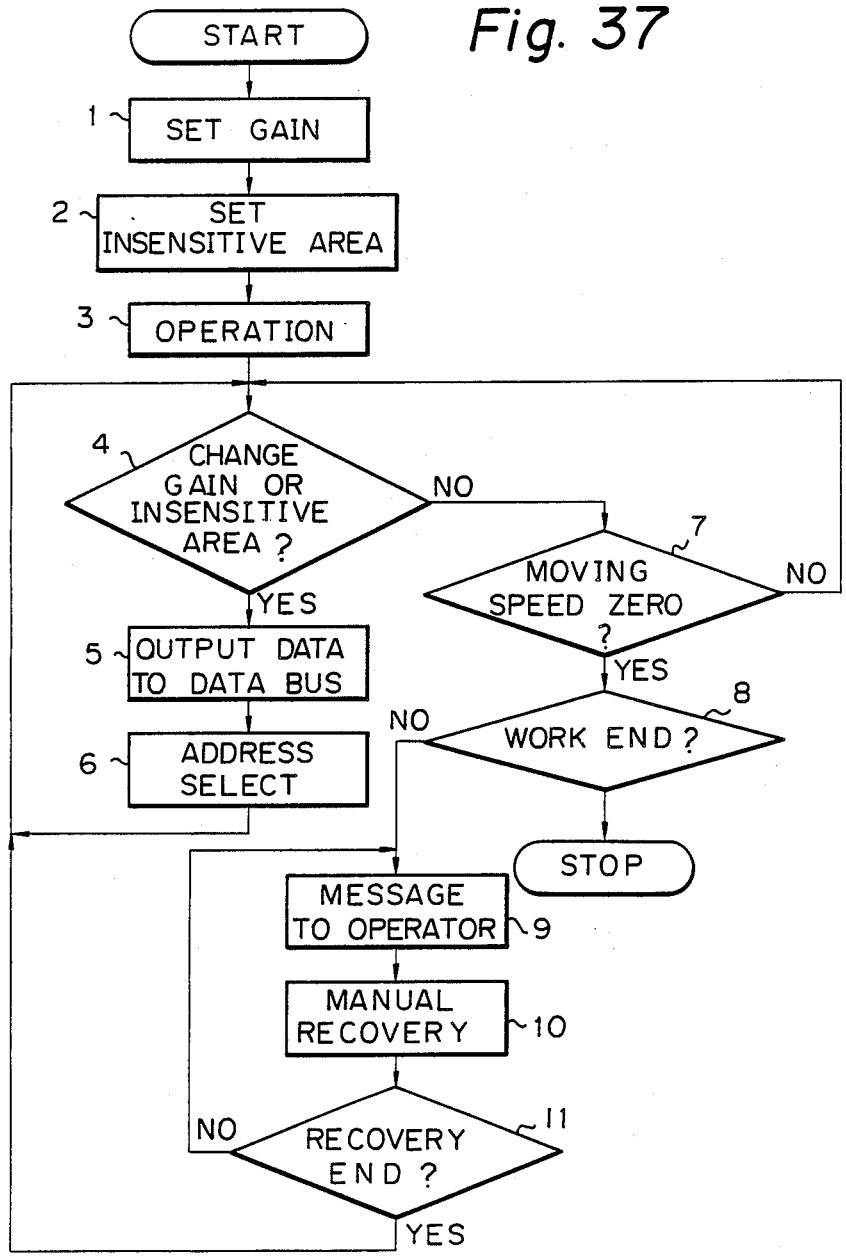

MOVABLE APPARATUS DRIVING SYSTEM

This is a continuation of co-pending application Ser. No. 708,545 filed on Mar. 5, 1985, now abandoned.

BACKGROUND OF THE INVENTION

1. Field of the Invention

The present invention relates to a movable apparatus driving system. More particularly, it relates to a robot contol system for a movable apparatus driving system.

2. Description of the Related Art

Recently, there has been remarkable increase in the use of industrial robots in manufacturing processes. However, since many conventional position control type robots operate regardless of environmental constraints, it is difficult to apply such robots to assembly work needing a very fine force adjustment. This is because, in such assembly work, there are many operations which necessitate not only absolute precision in the positioning of a part, but also a relative precision of the positioning between a mounting part and a part to be mounted. Therefore, to increase the precision of the robot itself is not enough when applying such robots to this kind of assembly work, since this leads only to further difficulties.

Conventionally, attempts have been made to solve these problems between the absolute precision and relative precision of the position of the part by adding a force control method to the position control. In this force control method, a force sensor is attached to the robot, and a motion of the robot is controlled based on an output of the force sensor. However, if, for example, the robot does not receive a feedback signal from the force sensor, i.e., the force sensor does not make contact with a part, the motion control of the robot is insufficient. Thus, since the robot cannot be controlled as required only by adapting force control, and, as mentioned above, the motion of the robot also cannot be controlled only by position control it is therefor necessary to apply both position control and force control to ensure fine control of the robot.

SUMMARY OF THE INVENTION

The primary object of the present invention is to provide a movable apparatus drive system by which the problems of the prior art are alleviated.

Another object of the present invention is to provide a robot control system which enables high precision position control by using both position and force control.

In accordance with the present invention, there is provided a movable apparatus drive system including: a driving device for the movable apparatus; a first output device for detecting environmental information data around the movable apparatus and for outputting a corresponding signal in response to the detected environmental information data; a second output device for outputting a command signal to drive the driving device and move the movable apparatus to a target position, based on target position data of the movable apparatus to be moved and current position data of the movable apparatus; and a supply device for supplying a composite signal constituted by the environmental information data and the command signal. Further, there is provided a robot control system including: a control device for controlling a motion of the robot in response to a command signal sent to the robot; a spring mechanism provided at a working point of the robot and used for detecting a deflection (displacement) caused by an external force applied to the robot; and a feedback device for feeding back a deflection feedback value obtained by multiplying the detected output of the spring mechanism by a predetermined gain.

According to the present invention, the control device controls the motion of the robot in response to the addition of a position command generated from the control device and the deflection feedback value. Still further, there is provided a method for teaching a goods treating procedure to a goods treatment apparatus (robot hand) including a goods treatment unit for treating the goods and a moving device for moving the goods treatment unit.

According to the present invention, the goods treatment unit is mounted to the moving device through a coupling unit which comprises a force detecting device for detecting a force added to the goods treatment unit. The moving device follows-up the goods treatment unit by driving the moving device based on a signal generated from the force detecting device when the goods treatment unit is manually operated, and a motion of the goods treatment unit is taught by storing the motion of the moving device based on the following-up. Moreover, there is provided a method for controlling the carriage of goods including, a goods treatment unit for carrying goods, a moving device for moving the goods treatment unit, a force sensor for detecting an external force applied to the goods treatment unit, and a control device for controlling the moving device based on an output of the force sensor.

According to the present invention, the control device includes a latch device for latching the output of the force sensor when the goods treatment unit takes over the goods to be carried, and then controls the moving device based on a difference between the output of the force sensor and data latched in the latch device.

In accordance with the structure of the present invention, when no constraint force (contact force) is applied, the apparent stiffness of the robot becomes equivalent to the stiffness of the spring mechanism itself, i.e., has a strong stiffness, so that position control having rigidity can be performed. When the constraint force is applied, the apparent stiffness of the robot is changed to a weaker stiffness so that control having adaptability to the external force can be performed. Accordingly, the robot according to the present invention can operate in a self-operated adapted operation mode by determining the existence or nonexistence of the constraint force. Moreover, according to the present invention, it is not necessary to modify a conventional position control system, in that only the deflection (displacement) feedback mechanism and its circuit need be added to the conventional position control system to make the force control possible. Accordingly, the robot according to the present invention can be realized at a relatively low cost and can be operated at a high stability in assembly operation. Moreover, sice the robot itself can change the stiffness condition, motions very similar to human actions can be realized, and thus the robot can be used for high level and precision assembly work.

In one application of the present invention, the operator can directly teach a motion route to the robot by only a weak hand-gripping force, since the force sensor can detect a very small force and force control is performed based on the force sensor signal detected by the control circuit.

BRIEF DESCRIPTION OF THE DRAWINGS

In the drawings:

FIG. 8B is a simplified perspective view of a force sensor with 6 degrees of freedom according to another embodiment of the present invention;

FIG. 9 is a schematic block diagram of a control circuit for processing signals from the force sensor according to an embodiment of the present invention;

FIG. 16 is a schematic view explaining the storage of a figure of the procedure in a memory shown in FIG. 11;

FIG. 24 is a schematic block diagram of a control circuit for a robot having a twist detection function added to the control circuit shown in FIG. 11;

FIG. 28 is a simplified, perspective view of the structure of a Cartesian co-ordinate type robot having multi-sensors, for example, a displacement sensor consisting of an ultra-sonic sensor, a force sensor, and limit sensors;

FIG. 37 is a flowchart of a basic control function of the robot shown in FIG. 28.

DESCRIPTION OF THE PREFERRED EMBODIMENTS

Figure 1:
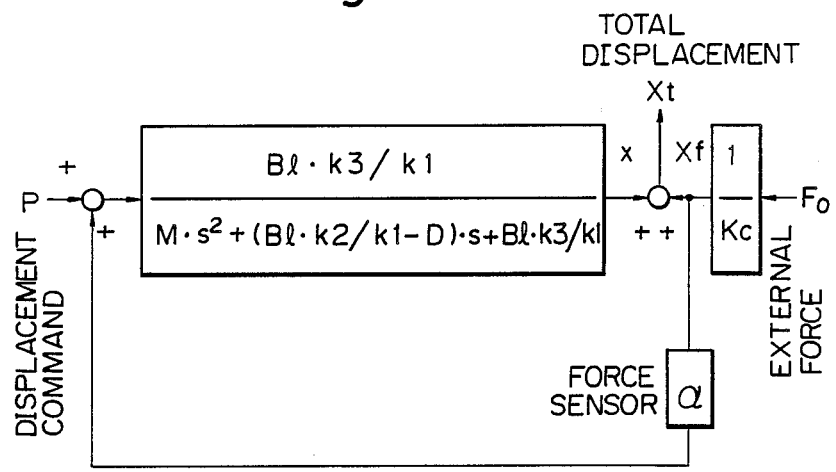
FIG. 1 is a diagram of a basic control block explaining a principle of the present invention.

A principle of the present invention will be explained with reference to FIGS. 1, 2, and 3. In FIG. 2, reference numeral 1 indicates a representation of a robot, 2 a spring mechanism mounted to an end effector (end of a hand) of the robot 1, and BJ a constraint surface of an object. According to the concept of the present invention, the robot can be considered to be equivalent to a kind of spring, as explained in detail below.

When the robot 1 is moving, a force generated from the robot 1 is shown by the following formula.

$$f = K \cdot (XO - x) \quad (1)$$

where, f is a force generated from the robot, K is a stiffness of the robot, XO is a target position, and x is a current position of the robot.

Since a constraint force is not included in formula (1), a controllable force Fr is added to the formula (1) as a force control. The force Fr is obtained by mounting a spring mechanism 2 having an insensitive portion therein. Accordingly, the formula (1) is transformed as follows.

$$f = K \cdot (XO - x) + Fr \quad (2)$$

$$Fr = Kc \cdot Xc \quad (3)$$

where, Kc is the stiffness of the spring mechanism 2 mounted at the end of the robot 1, Xc is the displacement of the spring mechanism 2 mounted at the end of the robot 1, and Fr is the contact force.

In the formulas (2) and (3), since independent commands such as a position control command (same as a movement command XO) and a force control command (same as a displacement command Xc to the spring mechanism 2 consisting of the insensitive area) are applied simultaneously in the formulas, the robot 1 must be considered uncontrollable. However, if the stiffness of the robot 1 can be controlled, a position control mode and a force control mode can be changed over by the robot 1 itself in order to achieve the force control and the position control simultaneously, as explained below.

In the case of the position control mode, if the stiffness K of the robot 1 can be controlled to become K>Kc, formula (2) becomes equivalent to formula (1) as a constraint force is not applied to the robot. Accordingly, the formula (b 2) is transformed as follows.

$$f = K \cdot (XO - x) \quad (4)$$

As is obvious from formula (4), the robot 1 generates the force f proportional to a displacement (Xo−x) in the same way as for a general position control mode. In this case, since it is assumed that the constraint force is not applied to the spring mechanism 2, the apparent displacement of the spring mechanism 2 is ignored.

In the case of a force control mode, if the stiffness K of the robot can be controlled to become K<<Kc, formula (2) becomes equivalent to the following formula (5) without respect to a displacement (XO−x) when the constraint force is applied to the spring mechanism 2. Accordingly, the following formula is given.

$$f = Fr(= Kc \cdot Xc) \quad (5)$$

The constraint force (same as a contact force) Fr can be controlled by the displacement Xc of the spring mechanism 2 as explained in detail below.

Figure 3:
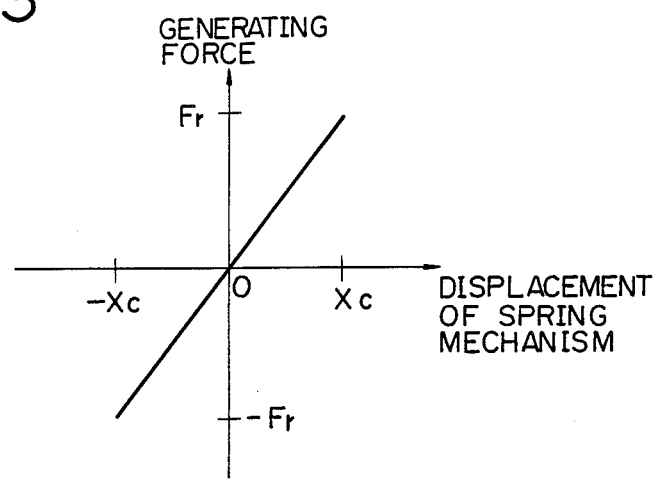
FIG. 3 is a graph explaining the relationship between a generating force and a displacement of the spring mechanism.

FIG. 3 shows a characteristic curve of the spring mechanism 2. The ordinate shows the generating force and the abscissa shows the displacement of the spring mechanism 2. To control the contact force Fr in the force control mode, the characteristic curve shown in FIG. 3 is used, so that the contact force $f_c$ can be controlled within the range of the following formula (6), where the slope of the characteristic curve signifies the stiffness Kc of the spring mechanism 2.

$$-Fr \leqq f_c \leqq Fr \quad (6)$$

In this case, the displacement of the spring mechanism 2 is set in the range of ±Xc by controlling the robot 1. In order to control this displacement to become $f_c = Fr$, the constraint surface (or constraint point) BJ shown in FIG. 2 should be set to a position (displacement) farther than the current position of the constraint surface BJ and this displacement amount is input to the robot 1 as the displacement command. At this time, the stiffness of the end of the robot 1 is controlled to become equivalent to the stiffness Kc of the end of the spring mechanism 2. When the spring mechanism 2 is deflected (displaced) by Xc, an apparent stiffness of the robot is controlled to a zero value, so that the spring mechanism 2 is displaced by Xc and the robot 1 is displaced in order to control the displacement Xc. Even if the distance between the robot 1 and the constraint surface BJ is changed, the displacement of the spring mechanism 2 can be maintained at the constant displacement Xc, thereby controlling the contact force to be the constant value of the generating force Fr.

As explained above, by controlling the stiffness K of the robot 1, a control system according to formula (2) is changed by the robot 1 itself between the position control mode (formula (4)) and the force control mode (formula (5)), and thus the system is controlled as required. In other words, by controlling the stiffness of the robot 1, the robot 1 can be controlled by the same function as that used by a human, according to the present invention. Accordingly, first, the robot 1 is operated by the rigidity mode based on the position controluntil the robot detects the constraint force; second, when the robot 1 detects the constraint force after coming into contact with an object, the robot 1 is operated in a soft mode, as can be done by using the same functions as those used by a human.

Figure 4A:
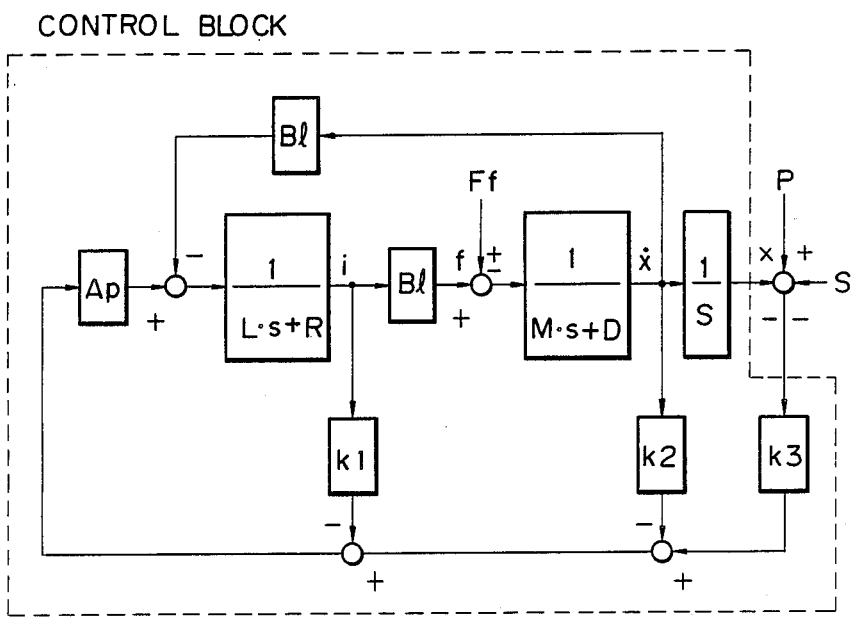
FIG. 4A is a diagram of a basic control block for a DC motor used in the control of the robot according to the present invention.

FIG. 4A is a diagram of a basic control block for a direct current motor (DC motor) which is used for controlling the stiffness of the robot in the position control mode.

Assuming that a characteristic of one of the shafts (for example, X-axis) driven by the DC motor of the robot 1 is shown by the following voltage and motion equations:

$$V = R \cdot i + L \cdot \dot{i} + Bl \cdot \dot{x} \quad (7)$$

$$fm = Bl \cdot i \quad (8)$$

$$fm = M \cdot \ddot{x} + D \cdot \dot{x} + F_f \quad (9)$$

where,
V is a terminal voltage of the DC motor,
R is a direct current resistance of the DC motor,
i is a current flowing in the DC motor,
L is an inductance of the DC motor,
Bl is a force constant of the DC motor,
fm is a generating force of the DC motor,
M is a mass of a moving portion,
D is a viscous damping factor of the moving portion,
$F_f$ is a friction force of the moving portion,
$\dot{x}$ is a speed,
x is a displacement of the moving portion, and
s is the Laplace operational factor.

A transfer function of the displacement of the robot 1 for the displacement command of the control system shown in FIG. 4A is shown as follows:

$$\frac{X(s)}{P(s)} = \frac{Ap \cdot Bl \cdot k3}{a3 \cdot s + a2 \cdot s^2 + a1 \cdot s + a0} \quad (10)$$

where,
$a0 = Ap \cdot Bl \cdot k3$
$a1 = Ap \cdot Bl \cdot k2 + Ap \cdot k1 \cdot D + R \cdot D + Bl^2$
$a2 = Ap \cdot k1 \cdot M + L \cdot D + R \cdot M$
$a3 = L \cdot M$ where,
Ap is an open loop gain of an operational amplifier,
P is a displacement command,
k1 is a feedback gain of a current,
k2 is a feedback gain of a speed, and
k3 is a feedback gain of a displacement Since Ap indicates a large value, for example, 80 to 100 dB, Ap is considered as infinite, i.e., Ap≈∞, and the formula (10) is transformed as follows.

$$\frac{X(s)}{P(s)} = \frac{Bl \cdot K3/k1}{M \cdot s^2 + (Bl \cdot k2/k1 + D) \cdot s + Bl \cdot k3/k1} \quad (11)$$

By the formula (11), the mechanical characteristic of the robot 1 is equivalent to the spring 2 having a stiffness characteristic of Bl·k3/k1. Accordingly, by setting the feedback gain k3 of the displacement to a large value, the stiffness of the robot becomes large and the robot 1 can be controlled with high accuracy.

Figure 2:
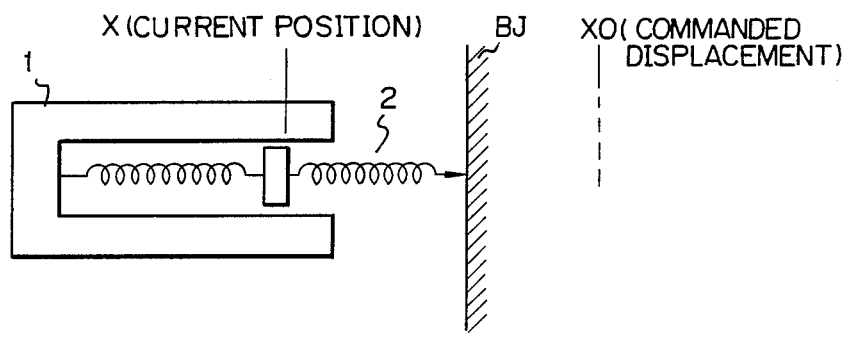
FIG. 2 is a schematic view of a robot explaining a principle of the present invention.

In this case, in FIG. 4A, 1/(L·s+R) indicates an electrical impedance; 1/(M·s+D), a mechanical impedance; P, a displacement command; S; a sensor signal; and 1/s, an integration. In other words, the robot 1 according to the present invention is controlled by both electrical and mechanical impedance. When the robot 1 is controlled by position control, the stiffness K of the robot 1 can be set at a large value.

Figure 4B:
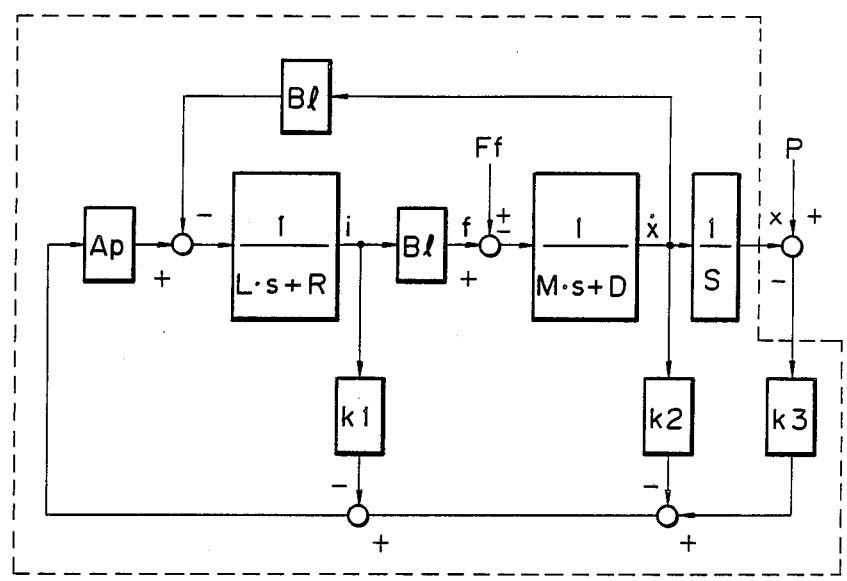
FIG. 4B is a diagram of a conventional basic control block for a DC motor used in the control of the robot.
Figure 4C:
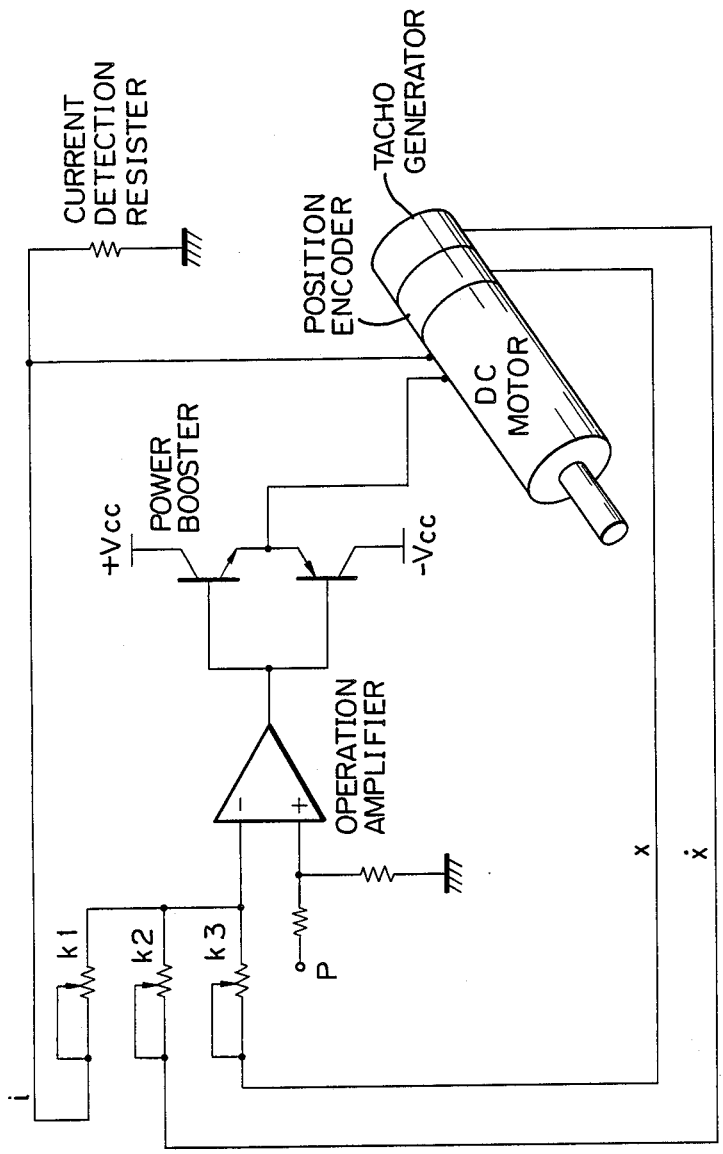
FIG. 4C is a schematic view of a conventional basic control circuit for a DC motor shown in FIG. 4B.

FIG. 4B is a diagram of a conventional basic control block of a DC motor used in the robot, and FIG. 4C is a conventional basic control circuit of a DC motor shown in FIG. 4B. As in obvious from both drawings, a displacement command P as a position control signal is input to the plus side of the operational amplifier. When the position control is changed to the force control, the force control signal is also input to the same terminal as the position control. In this case, k1 to k3 are changed so as to make the servo-operation stable. However, vibration or runaway of the DC motor occurs during the changing of k1, k2, and k3.

FIG. 1 is a diagram of a basic control block explaining a principle of the present invention. The closed loop transfer function of the position control system has already been shown by the formula (11).

In the drawing, $X_t$ is the total displacement (i.e., the displacement of the robot 1 plus the displacement of the spring mechanism 2), $F_o$ is an external force (same as the contact force already explained), $X_f$ is the displacement of the spring mechanism 2, and $\alpha$ is an input gain of the displacement of the spring mechanism 2 (this $\alpha$ is generated from a force sensor explained hereinafter).

In this control system, the spring mechanism 2 having the stiffness $K_c$ is mounted at the end of the robot 1, and the displacement $X_f$ results when the external force $F_o$ is applied and is added to a displacement command P through the gain $\alpha$.

In this control system, the total displacement $X_t$ is shown by adding the displacement X of the end of the robot 1 (i.e., x(s)) to the displacement $X_f$ of the spring mechanism 2 mounted at the end of the robot. Namely, $$X_t(s) = x(s) + X_f(s) \quad (12)$$

Accordingly, when the external force $F_o$ is applied to the spring and the end of the robot 1 is displaced by $X_t$, the apparent stiffness of the robot 1 is shown by $F_o/X_t$. Accordingly, the transfer function $F_o(s)$ of the control system shown in FIG. 1, is shown by the following formula:

$$\frac{F_o(s)}{X_t(s)} = \quad (13)$$

$$K_c \cdot \frac{M \cdot s^2 + (D + Bl \cdot k2/k1)s + Bl \cdot k3/k1}{M \cdot s^2 + (D + Bl \cdot k2/k1)s + Bl \cdot (1 \pm \alpha) \cdot k3/k1}$$

In a stationary state, the Laplace operational factor s is approximately equal to zero, i.e., the robot is moved by a constant speed or the external force is constant, and the formula (13) is transformed as follows:

$$\frac{F_o(s)}{X_t(s)} \approx K_c \frac{1}{1 \pm \alpha} \quad (14)$$

As is obvious from formula (14), the apparent stiffness of the robot 1 is shown by multiplying the stiffness Kc of the spring mechanism 2 by $1/(1\pm\alpha)$. At the positive side, the larger the input gain $\alpha$, the smaller the stiffness, and the force control mode is realized. As explained above, when no external force is added, the displacement of the end of the robot 1 is equal to the displacement of the robot 1 itself (in this case, the displacement of the spring 2 is zero), and the apparent stiffness K of the robot 1 is shown by the following formula wherein the stiffness of the robot 1 is equivalent to that of the spring mechanism:

$$K = K_c \quad (15)$$

where, stiffness of the robot 1 itself is shown by Bl·k3/k1.

Meanwhile, when the external force is added to the robot 1, the apparent stiffness K of the robot 1 is shown by the following formula:

$$K = K_c \cdot \frac{1}{1 \pm \alpha} \quad (16)$$

The stiffness K of the robot 1 shown in formula (2) can be controlled by using the above-explained method.

Next, a method for controlling the contact force Fr applied to the constraint surface BJ will be explained.

The contact force Fr is controlled by the deflection (same as displacement) $X_c$ of the spring 2 mounted at the end of the robot 1, as shown in FIGS. 2 and 3. Such a control of the contact force Fr to the spring 2 can be realized by providing an insensitive area in the displacement signal generated from the spring mechanism 2 (this spring mechanism 2 is a force sensor). In this case, the force within the range of the insensitive area of the spring 2 is the contact force Fr, and the slope is the input gain $\alpha$ which is variable.

Even if the object BJ is displaced against the commanded displacement XO, the robot 1 can be stopped at the point where it just touches the object BJ and can be placed in contact with the object BJ by a predetermined contact force Fr. Therefore, any error due to the position control mode can be compensated by this insensitive area.

By utilizing this insensitive area in the position control, another application is possible as explained with reference to FIGS. 6A and 6B.

Figure 6A:
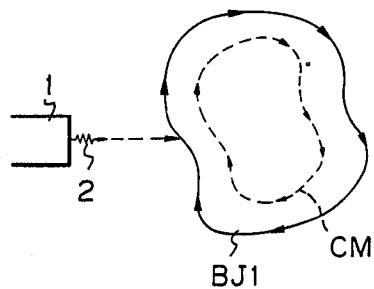
FIGS. 6A and 6B are schematic views explaining a profiling motion and a long way motion of the robot according to the present invention.

In FIG. 6A, the route of the movement of the end of the robot 1 is set to the inside portion of the object BJ1, as shown by a dotted line CM. The robot 1 can follow the profile of the outer line of the object BJ1. Accordingly, robot 1 can be used for measuring the configuration of the outer line or for working to the outer line of the object BJ1.

Figure 6B:
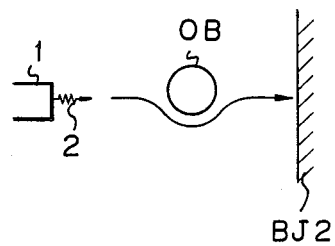

In FIG. 6B, when the robot 1 encounters and touches an obstacle OB between the robot 1 and the object BJ2, the robot 1 itself can change its course so as to avoid the obstacle OB and can reach the object BJ2.

Figure 7:
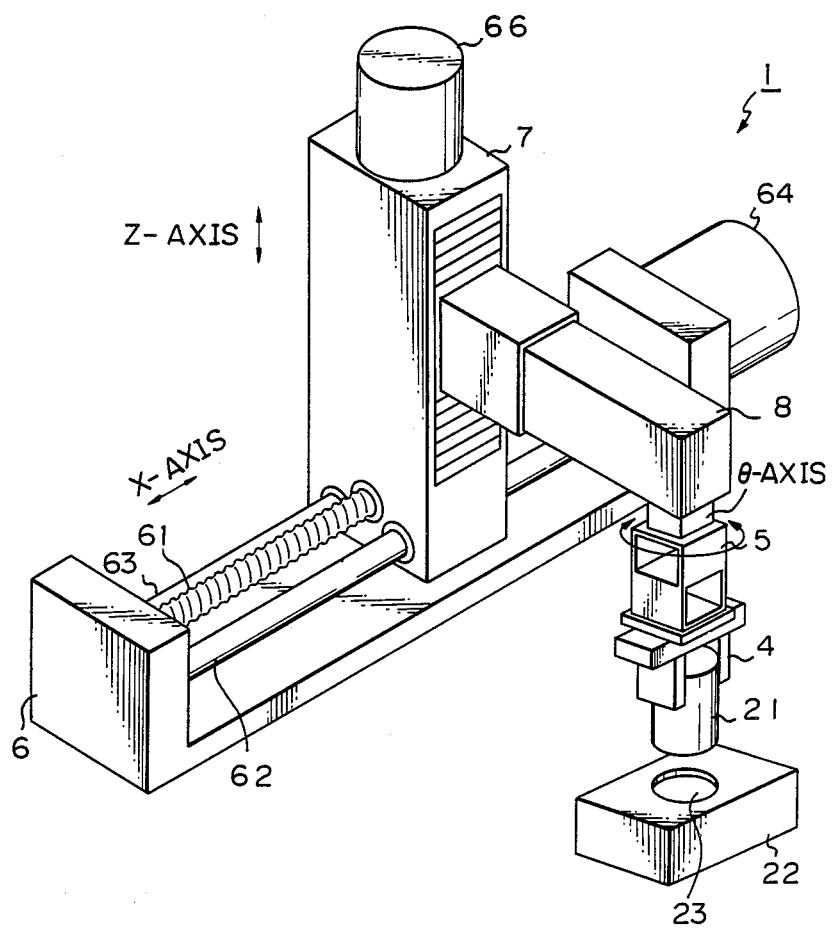
FIG. 7 is a simplified, perspective view of the structure of the robot, especially, an Cartesian co-ordinate type robot provided with an force sensor according to the present invention.

FIG. 7 is a perspective view of the structure of the robot 1, especially, a Cartesian co-ordinate type robot 1 according to an embodiment of the present invention. Both position and force control modes mentioned above are utilized for this robot 1 by using a force sensor and electric circuits. In FIG. 7, the reference numeral 6 identifies the base of the robot 1; 61, a feed screw used as a drive shaft for moving an arm support in the X-axis direction; 62 and 63 are guide bars for guiding the arm support in the X-axis direction, ad 64 is an X-axis DC motor for driving the robot in the X-axis direction by rotating the drive shaft. Reference numeral 7 is an arm support driven by the X-axis motor 64 in the X-axis direction, and this supports and drives an arm 8; 66 is a Z-axis DC motor for driving the supported arm 8 by the arm support 7, 8 is an arm supported by the arm support 7 and riven thereby in the Z-axis direction, and arm 8 is driven in the Y-axis direction by a Y-axis DC motor (not shown). Reference numeral 5 is a force sensor mounted at the end of the arm 8, and 4 is a hand mounted on the force sensor 5 for gripping the object. The robot 1 is of the Cartesian co-ordinate type having X, Y, Z and $\theta$-axes shafts and is used, in general, for assembly work.

Figure 8A:
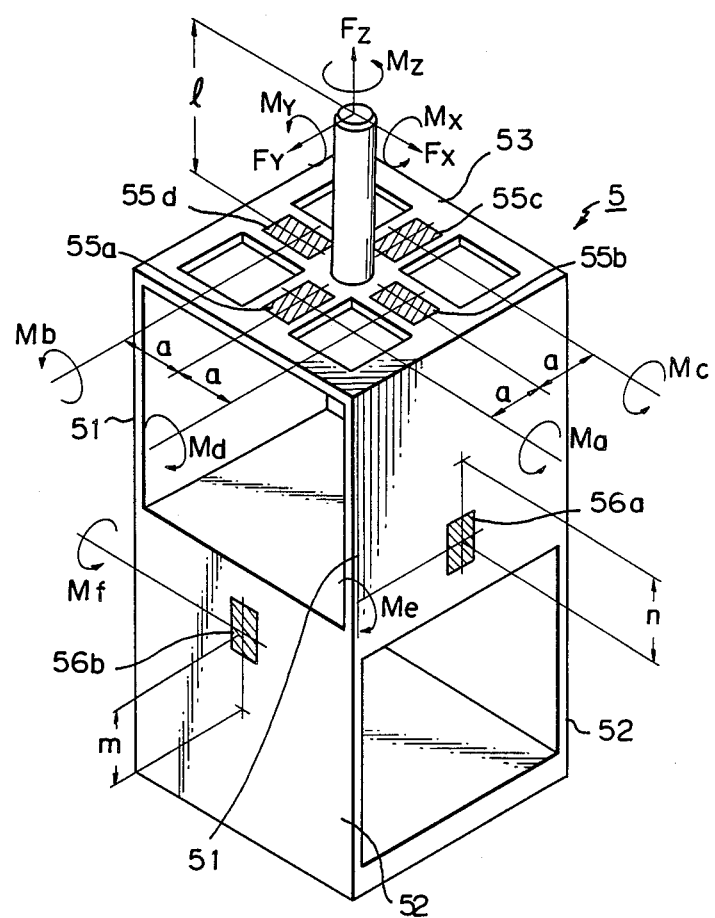
FIG. 8A is a simplified, perspective view of a force sensor with 5 degrees of freedom according to an embodiment of the present invention.

FIG. 8A is a schematic perspective view of the force sensor 5, with 5 degrees of freedom, shown in FIG. 7. The force sensor 5 is formed, for example, as a box structure, and the box comprises a plurality of flat springs and a plurality of strain gauges mounted on the surfaces of the flat spring. In FIG. 8A, reference numeral 51 is an X-directional flat spring, and 52 is a Y-directional flat spring. Reference numeral 53 is a cross spring provided at the upper portions of the flat springs 51 and 52. Thus the force sensor 5, i.e., same as the spring mechanism 2 explained in FIG. 2, is constituted by two pairs of flat springs 51, 52 and a cross spring 53, and is in the form of a box. Accordingly, the force sensor can detect deflection (displacement) from all directions by external force applied through the hand, as explained below. Reference numerals 55a, 55b, 55c, and 55d are strain gauges (force detectors) provided on the surface of the cross spring 53, and 56a, 56b are also strain gauges and are provided on the surfaces of the flat springs 51, 52, respectively. The strain gauge 55a is used for detecting a moment $M_a$, 55b for a moment $M_b$, 55c for a moment $M_c$, and 55d for a moment $M_d$. Also, the strain gauges 56a and 56b are used for detecting the respective moments $M_e$ and $M_f$. As is known, the strain gauge comprises four resistors connected in the form of a bridge circuit. The moment is detected by the change of an output voltage in response to a change of a displacement.

The X, Y, and Z directional force Fx, Fy, and Fz, and at the X, Y directional moments $M_x$, $M_y$ are shown by the following formulas:

$$M_a = aF_z + M_y \qquad (17)$$

$$M_b = aF_z + M_x \qquad (18)$$

$$M_c = aF_z - M_y \qquad (19)$$

$$M_d = aF_z - M_x \qquad (20)$$

$$M_e = nF_x \qquad (21)$$

$$M_f = mF_y \qquad (22)$$

where, a is a distance between a center of the cross spring 53 and a center of the strain gauge (55a to 55d), m is a distance between a center of the flat spring 52 and a center of the strain gauge 56b, and n is a distance between a center of the flat spring 51 and a center of the strain gauge 56a.

By transforming formulas (17) to (22), the following formulas are given.

$$F_x = M_e/n \qquad (23)$$

$$F_y = M_f/m \qquad (24)$$

$$F_z = (M_a + M_b + M_c + M_d)/4a \qquad (25)$$

$$M_x = (M_b - M_d)/2 \qquad (26)$$

$$M_y = (M_a - M_c)/2 \qquad (27)$$

FIG. 8B is a schematic perspective view of a force sensor with 6 degrees of freedom according to another embodiment of the present invention. This force sensor comprises a twist force sensor 41 for detecting the torque generated about the Z-axis, in addition to the force sensor shown in FIG. 8A. The plate springs 41a, 41b, 41c, and 41d of the twist force sensor 41 are formed, by, for example, using an electrical discharge machine. The strain gauges 44a, 44b, 44c, and 44d symmetrically are attached to a common side surface of the plate spring (as shown in the drawing) for detecting the twist torque $M_g$. In this sensor, $M_g$ is equal to $M_Z$.

Figure 8C:
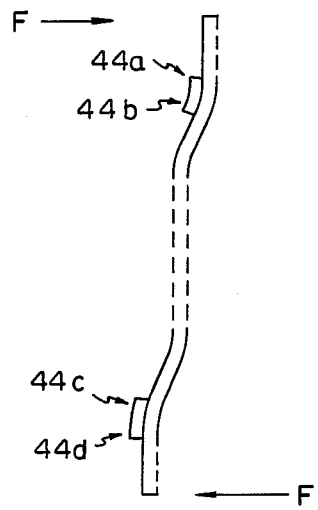
FIGS. 8C and 8D are sectional views of a spring mechanism. The strain gauges shown in FIG. 8B are deflected as shown in FIGS. 8C and 8D when the force F is applied.
Figure 8D:
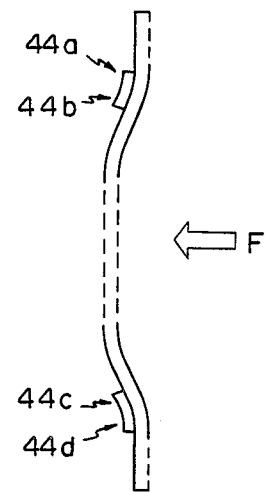
Figure 8E:
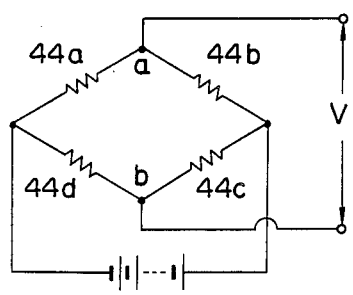
FIG. 8E is a force detection circuit comprised of a bridge circuit formed by the strain gauges shown in FIG. 8B.

FIGS. 8C and 8D are sectional views of a flat spring. The strain gauges are deflected as shown in FIG. 8B when the twist torque F is added. FIG. 8E is a bridge circuit formed by the strain gauges 44a, 44b, 44c, and 44d. In FIGS. 8C, 8D, and 8E, when the twist force F around the shaft is applied to the strain gauges, the strain gauges 44a and 44b are contracted and the strain gauges 44c and 44d are expanded, as shown in FIG. 8C. Accordingly, the voltage V between the terminals a and b in the bridge circuit of FIG. 8E is given by the following formula, when using the bridge circuit shown in FIG. 8E;

$$V = (R - \Delta R)i + (R + \Delta R) = 2 \Delta R i$$

Meanwhile, when the a force F directed toward the shaft is applied to the strain gauges, all strain gauges 44a to 44d are contracted as shown in FIG. 8D. Accordingly, the voltage V between the terminals a and b is given by the following formula:

$$V = (R - \Delta R)i - (R - \Delta R)i = 0$$

where, R is resistance. As is obvious from these formulas, the force around the shaft, i.e., twist force F, can be detected by the bridge circuit without influence form the directed toward the shaft.

The twist force sensor 41 is mounte to the center shaft of the force sensor shown in FIG. 8A by a screw 39. The screw holes 43a, 43b, 43c and 43d are used for coupling to the hand 4 (FIG. 7). The reference numerals 64 to 67 identify solid surfaces which limit the displacement of the plate springs 41a to 41d.

FIG. 9 is a simplified block diagram of a control circuit for processing signals from the force sensor according to an embodiment of the present invnetion. In FIG. 9, the reference numeral 20 is a position control unit consisting of a microprocessor. The microprocessor reads out a displacement command stored in an internal memory and outputs a position command pulse in response to a commanded displacement or speed. The reference numeral 30 is a sensor signal processing circuit which receives an insensitive area command Fr and a gain α generated from the unit 20, and also receives the detection moments $M_a$ to $M_f$ generated from the force sensor 5, and outputs a command pulse. The reference numerals 40a and 40b are both NAND gates which output an inverted command pulse. The NAND gate 40a is used for up-counting and gate 40b for down-counting. The reference numeral 60 is a servo circuit used for each of the shafts. The servor circuit 60 drives each DC motor at a speed determined by and based on conversion of an input pulse frequency.

Figure 10:
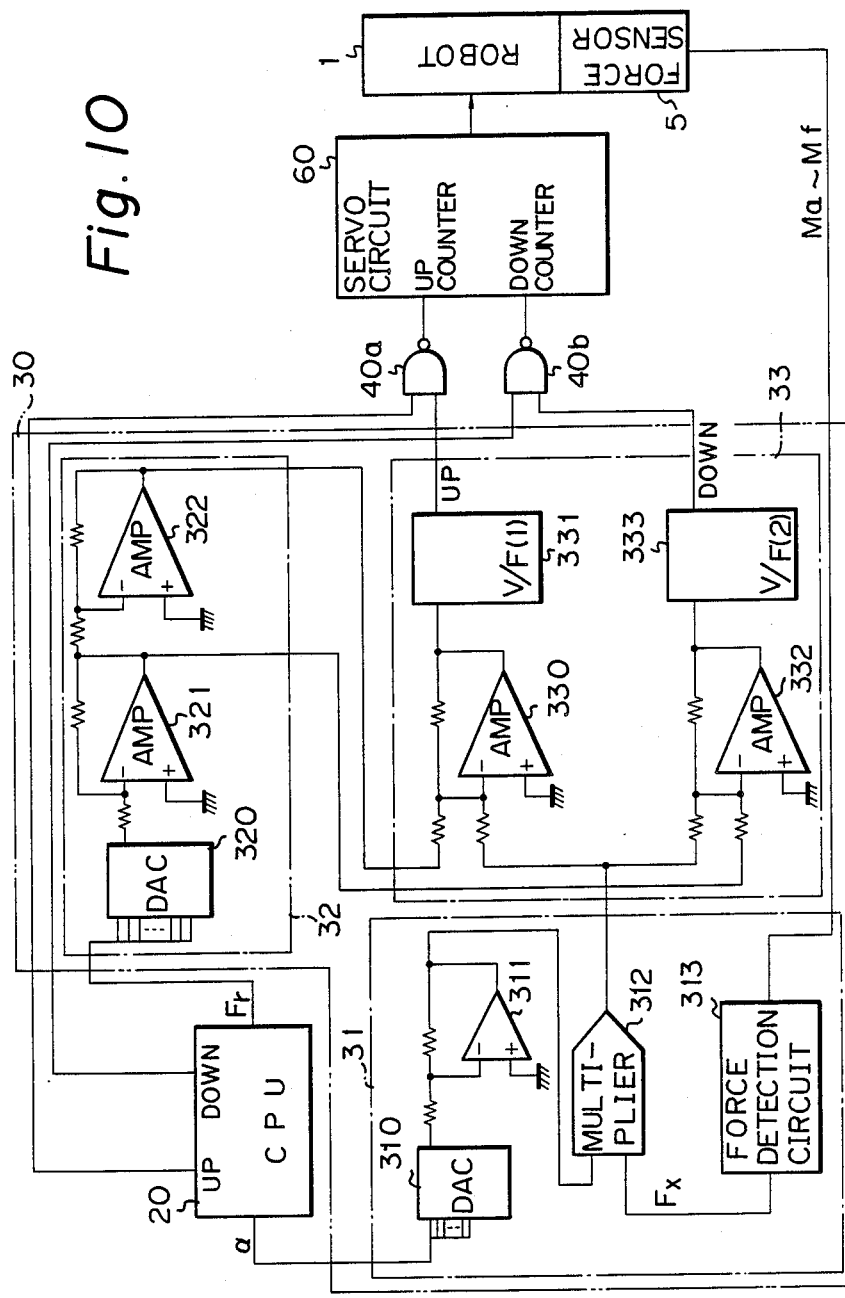
FIG. 10 is a detailed block diagram of a sensor signal processing circuit as shown in FIG. 9.
Figure 11:
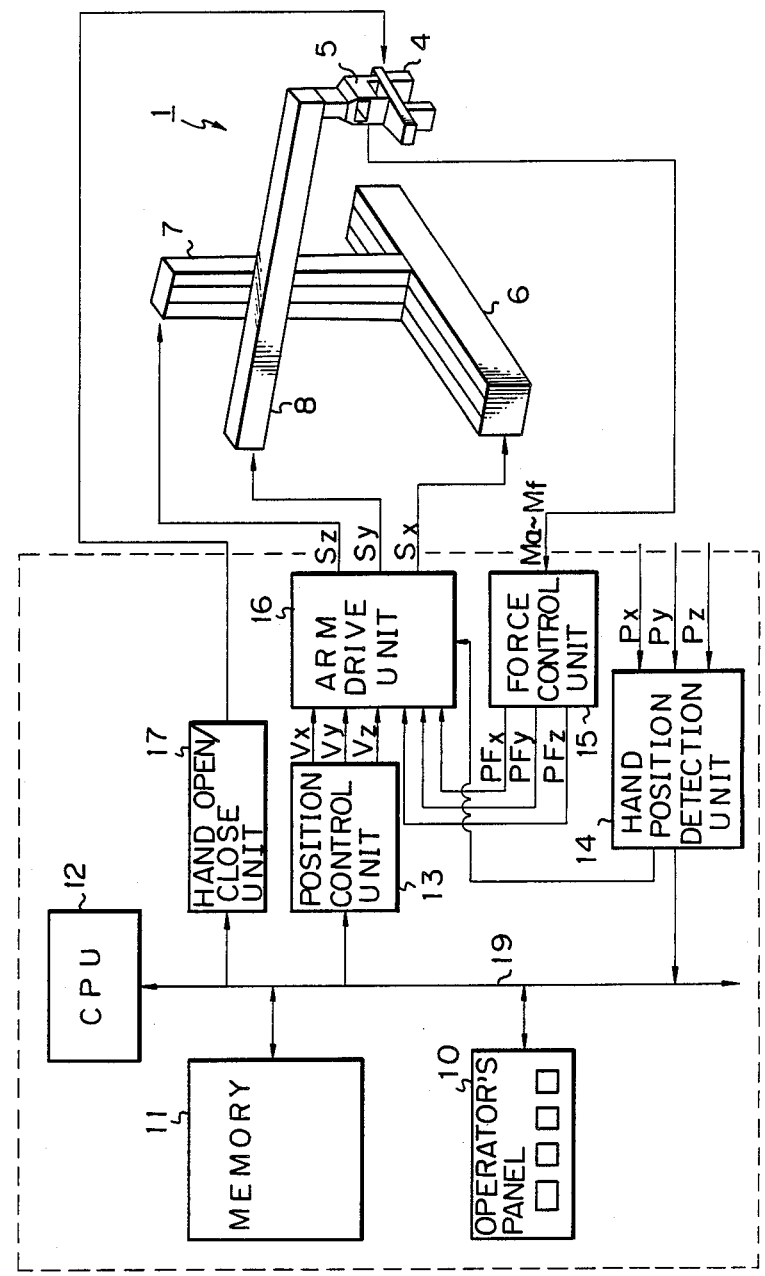
FIG. 11 is a schematic block diagram of a control circuit for a robot according to an embodmment of the present invention.
Figure 13:
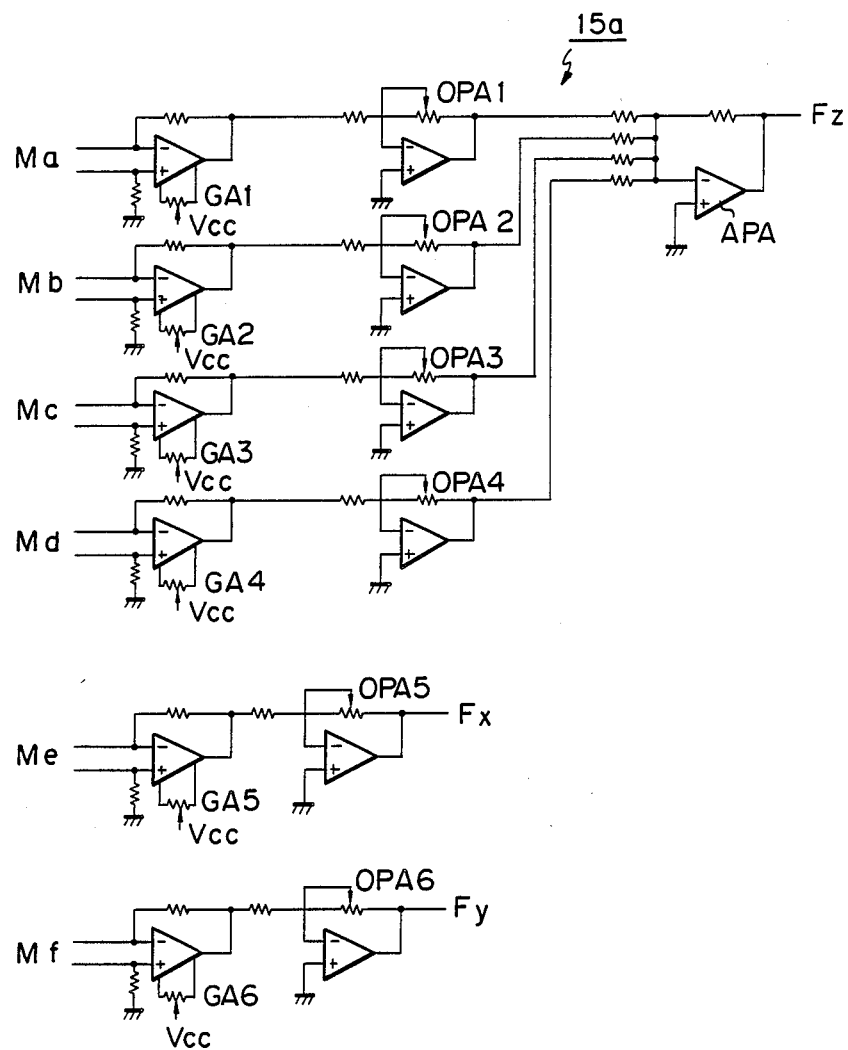
FIG. 13 is a detailed circuit schematic view of the force component detection circuit shown in FIG. 12.

FIG. 10 is a detailed block diagram of the sensor signal processing circuit 30 shown in FIG. 9. The reference numeral 31 is a force feedback unit which obtains a feedback value by the detection moments $M_a$ to $M_f$ from the force sensor 5 and the gain α from the microprocessor 20. The force feedback unit, comprises a digital/analog converter ("DAC") 310 which converts the gain α to an analog value, an inverting amplifier 311 which inverts an output of the DA converter 310, and a multiplier 312 which multiplies the gain α of the inverting amplifier 311 by the force output $F_x$ of the force detection circuit 313. The force detection circuit 313 shown in FIG. 13 is for detecting the force component of each shaft based on the detection moments $M_a$ to $M_f$. The reference numeral 32 is an insensitive area generating unit which outputs an analog converted insensitive area value. The insensitive area generating unit 32 comprises a digital/analog converter ("DAC") 320 which converts an insensitive area command $F_r$ from the microprocessor 20 to an analog command, an inverting amplifier 321 which inverts an output of the DA converter 320, and an inverting amplifier 322 which inverts the output of the inverting amplifier 321. Reference numeral 33 is a force command pulse generating unit which generates a force command pulse in response to a force feedback output from the unit 31 due to the insensitive area generated from the unit 32. The force command pulse generating unit 33 comprises an addition amplifier 330 which adds the insensitive area of the inverting amplifier 322 to the force feedback output of the multiplier 312, an addition amplifier 332 which adds the insensitive area of the inverting amplidier 321 to the force feedback output of the multiplier 312, a voltage/frequency (V/F) converter 331 which outputs an output pulse of the addition amplifier 330 when the output pulse of it is positive, and a voltage/frequency converter 333 which outputs an output pulse of the addition amplifier 332 when the output pulse thereof is posit FIG. 11 is a simplified block diagram of a control circuit for the robot 1 according to an embodiment of the present invention. In FIG. 11, as mentioned above, reference numeral 1 is the robot, 4 the hand, 5 the force sensor, 6 the X-axis base, 7 the Z-axis base, and 8 the Y-axis base. Reference numeral 10 is an operator's panel having a plurality of operation buttons for commanding various modes, for example, a playback mode, a teaching mode, a position and an attitude control store mode, and a motion mode of the hand 4. These buttons are manually operated by an operator. Reference numeral 11 is a memory unit for storing teaching and other data. Reference 12 is a microprocessor (CPU). The microprocessor 12 reads out the teaching data from the memory 11, generates a motion route of the hand 4, sends motion route data to a position control unit, and sends open and close commands to the hand 4 to a hand open and close unit in the playback mode. Moreover, the microprocessor 12 generates teaching data in response to a position detected by a hand position detection unit, and stores the teaching data in the memory 11. These operations in the teaching mode are controlled by a program.

Reference 13 is the position control unit. The position control unit 13 outputs a plurality of frequency pulses $V_x$, $V_y$, and $V_z$ converted from displacement values of each axis ΔX, ΔY, and ΔZ in response to the motion route command sent from the microprocessor 12 to control the position or speed. A main control section is constituted by the memory control unit 12 and the position control unit 13.

Reference 14 is a hand position detection unit. The hand position detection unit 14 receives the output from each encoder $P_x$, $P_y$, and $P_z$ generated from each axis drive source (DC motor) for detecting a three dimensional position (X, Y, Z) in the present stage of the hand 4.

Reference 15 is a force control unit. The force control unit generates a control command based on the detected output $M_a$ to $M_f$ by the force sensor 5, and generates a follow-up displacement value $PF_x$, $PF_y$, and $PF_z$ of each axis. This force control unit 15 will be explained in detail in FIG. 12.

Reference 16 is an arm drive unit. The arm drive unit 16 drives each drive source based on the displacement ΔX, ΔY, and ΔZ sent from the position control unit 13, and the follow-up displacement $PF_x$, $PF_y$, and $PF_z$ sent from the force control unit 15. An arm drive section is constituted by the arm drive unit 16 and each drive source, i.e., DC motor, and a hand drive section is constituted by the arm drive section, base 6, and both arms 7, 8.

Reference 17 is a hand open/close unit. The hand open/close unit drives a hand 4 based on open or close commands sent from the microprocessor 12.

Reference 19 is a bus line interconnecting between the microprocessor 12 and the memory 11, the operator's panel 10, the position control unit 13, the position detection unit 14, and the hand open/close unit 17.

Figure 12:
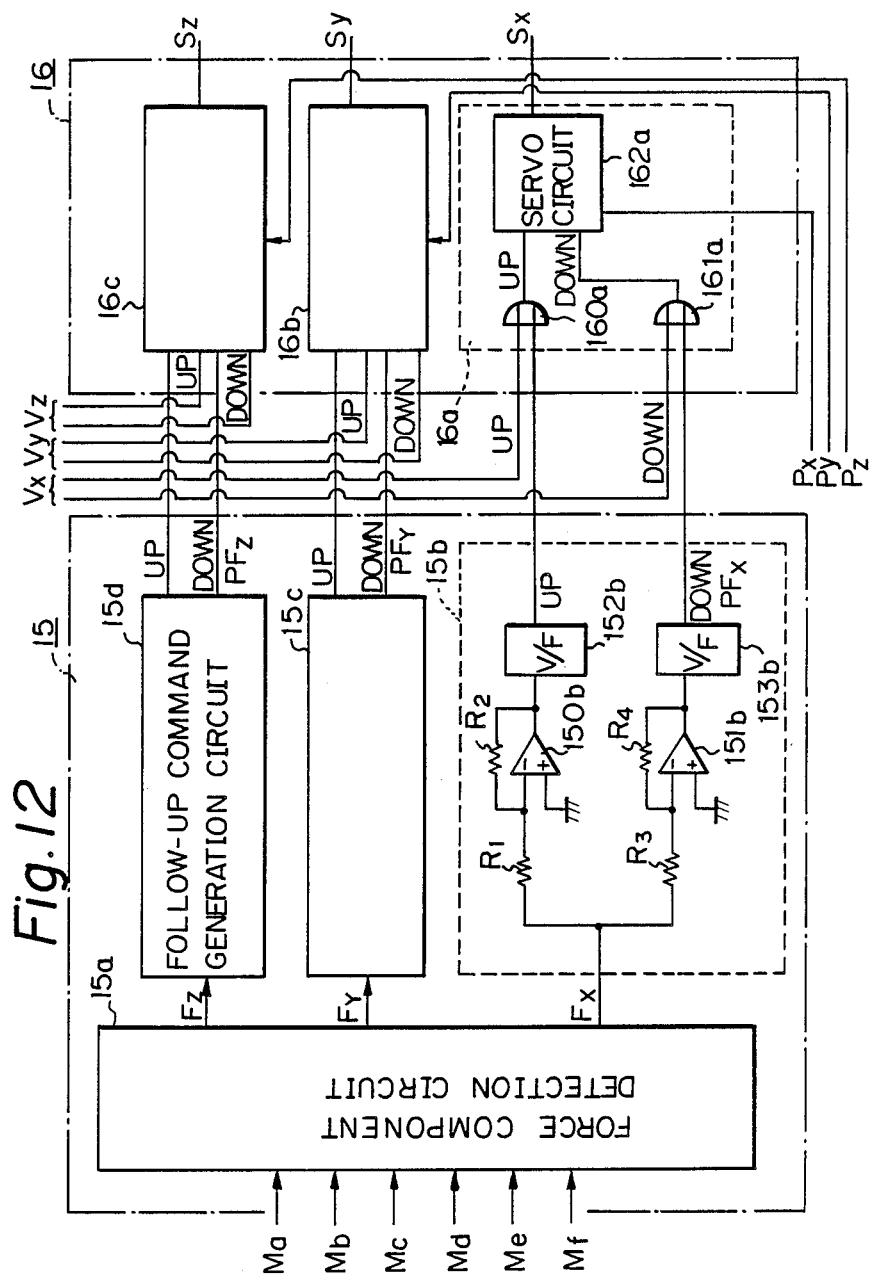
FIG. 12 is a detailed block diagram of a force control unit and an arm driving unit shown in FIG. 11.

FIG. 12 is a detailed block diagram of the force control unit 15 and arm drive unit 16 shown in FIG. 11. In FIG. 12, reference numeral 15a represents a force component detection circuit which detects a force component of each axis $F_x$, $F_y$, and $F_z$ based on each detected moment $M_a$ to $M_f$ from the force sensor 5. The reference numerals 15b to 15d represent follow-up command generation circuits which output follow-up command pulses $PF_x$, $PF_y$, and $PF_z$ based on the respective force components $F_x$, $F_y$, and $F_z$ from the force component detection circuit 15a. Each follow-up command generation circuit 15b to 15d has the same structure. For example, the follow-up command generation circuit 15b comprises gain control amplifiers 150b, 151b and voltage-to-frequency converters (V/F converter) 152b, 153b. When the force component $F_x$ indicates a positive value, an up-count pulse frequency response to an amplitude of the force is generated from the V/F converter 152b. Meanwhile, when the force component $F_x$ indicates a negative value, a down-count pulse frequency response to an amplitude of the force is generated from the V/F converter 153b as a follow-up command $PF_x$. Reference numerals 16a to 16c are drive circuits contained in the arm drive unit 16. These circuits 16a to 16c output drive signals $S_x$, $S_y$, and $S_z$ based on follow-up commands $PF_x$, $PF_y$, and $PF_z$, and move commands $V_x$, $V_y$, and $V_z$ from the position control unit 13. For example, the drive circuit 16a comprises a pair of OR circuits 160a, 161a, and a servo circuit 162a. The OR circuit 160a applies the output of the up-count pulse of the move command $V_x$ and the follow-up command $PF_x$ to the servo circuit 162a. The OR circuit 161a applies the OR output of the down-count pulse of the move command $V_x$ and the follow-up command $PF_x$ to the servo circuit 162a. The servo circuit 162a comprises an up-down counter, digital-to-analog converter (D/A converter) and a servo amplifier (not shown). The up-down counter counts up the output of the OR circuit 160a, and counts down the output of the OR circuit 161a, and also counts up or down the position pulse $P_x$ from the hand position detection unit 14. The up-down counter calculates the difference between the commanded position and the actual position, the difference value is converted to the analog value by the D/A converter, and the drive signal is output after amplification by the servo amplifier.

FIG. 13 is a detailed circuit diagram of the force component detection circuit 15a shown in FIG. 12. This circuit comprises a plurality of amplifiers and resistors which produce force components $F_x$, $F_y$, and $F_z$ from moments $M_a$ to $M_f$, based on the relationships shown in formulas 23 to 27. GA1 to GA6 are gain control amplifiers, each amplifier adjusting the gain of its corresponding moment $M_a$ to $M_f$. OPA1 to OPA6 are operational amplifiers. The operational amplifiers OPA1 to OPA4 are provided to obtain a quarter of the respective moments $M_a$ to $M_d$. OPA5 is provided to obtain 1/n of the moment $M_e$ and OPA6 is provided to obtain 1/m of the moment $M_f$. The amplifier APA is an addition amplifier which outputs the force component $F_z$ by adding the outputs of the operation amplifiers OPA1 to OPA4. Accordingly, the formula (25) is given by using the addition amplifier APA and the operational amplifiers OPA1 to OPA4, and the Z-axis force component $F_z$ is obtained by the output of the amplifier APA. The formula (23) is given by using the operational amplifier OPA5, and the X-axis force component $F_x$ is obtained by the output of the amplifier OPA5. The formula (24) is given by using the operational amplifier OPA6, and Y-axis force component $F_y$ is obtained by the output of the amplifier OPA6.

The operation, especially force control, of the circuits shown in FIGS. 12 and 13 will be explained in detail below.

When a gripping force is applied to the hand 4 of the robot 1, the moments $M_a$ to $M_f$ corresponding to the added force are detected by the force sensor 5, and the detected moments are input to the force component detection circuit 15a as shown in FIG. 13. In the force component detection circuit 15a, the force components $F_x$, $F_y$, and $F_z$ of each axis are detected, based on the moments $M_a$ to $M_f$, and are applied to the respective follow-up command generation circuits 15b to 15d of the corresponding axes as shown FIG. 12 and as mentioned above. The follow-up command generation circuits 15b to 15d output up or down pulses corresponding to the polarity of the respective, detected force components $F_x$, $F_y$, and $F_z$. The follow-up command of this pulse train (up or down pulse train) is input to the drive circuits 16a to 16c together with the normal move commands $V_x$ to $V_z$, the drive signals $S_x$, $S_y$, and $S_z$ are output from the drive circuit 16a to 16c, and each X, Y, and Z-axes (DC motors) of the robot are driven by the corresponding drive $S_x$, $S_y$, and $S_z$ in the direction in which the added force to the hand becomes zero.

Force control of this circuit 15 is performed independently from the position control in the position control unit 13. Each of the drive arms 6, 7, and 8 is controlled by the position in the direction in which the added force to the hand becomes zero, and applies a retaining force to the hand 4. As explained above, in this embodiment, each force component $F_x$, $F_y$, and $F_z$ based on the force sensor 5 is not directly applied to each drive source as the drive signal, but is converted to a follow-up command in the same way as a command of the normal position control system. The follow-up command is input to the servo drive circuit 16 in the same way as the position command of the position control system, and is applied to each axis of the drive sources to carry out the servo-drive. Accordingly, in the force control, the force components $F_x$, $F_y$, and $F_z$ based on the outputs of the force sensor 5 do not merely represent a feedback signal, and instead each is used for generating the follow-up command for the position feedback. Thus, common use of the servo system is also made possibel, and likewise it is possible to perform the retaining force control plus the position control, and it is possible to drive it in parallel with the position control of the position control system.

According to the present invention, by utilizing a characteristic of such a position control and a force control, when the robot is taught a procedure by an operator by using the hand 4, the force added to the hand 4 manually is detected by the force sensor 5. The drive source of the hand 4 is driven based on the force added to the hand 4, and the robot is controlled in the direction of the force which the operator has applied to the hand 4, so that the hand 4 can be moved according to the intention of the operator.

Figure 14:
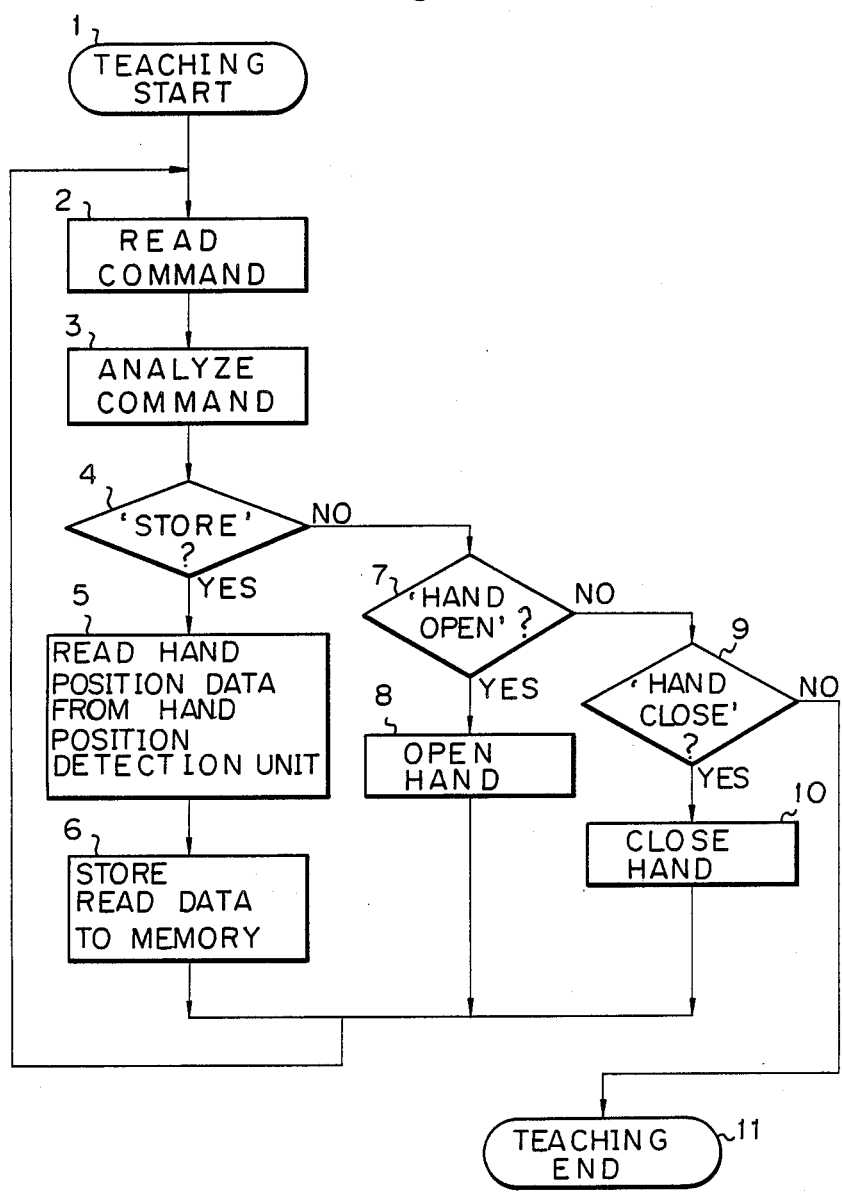
FIG. 14 is a flowchart of a teaching procedure for a robot according to the present invention.
Figure 15:
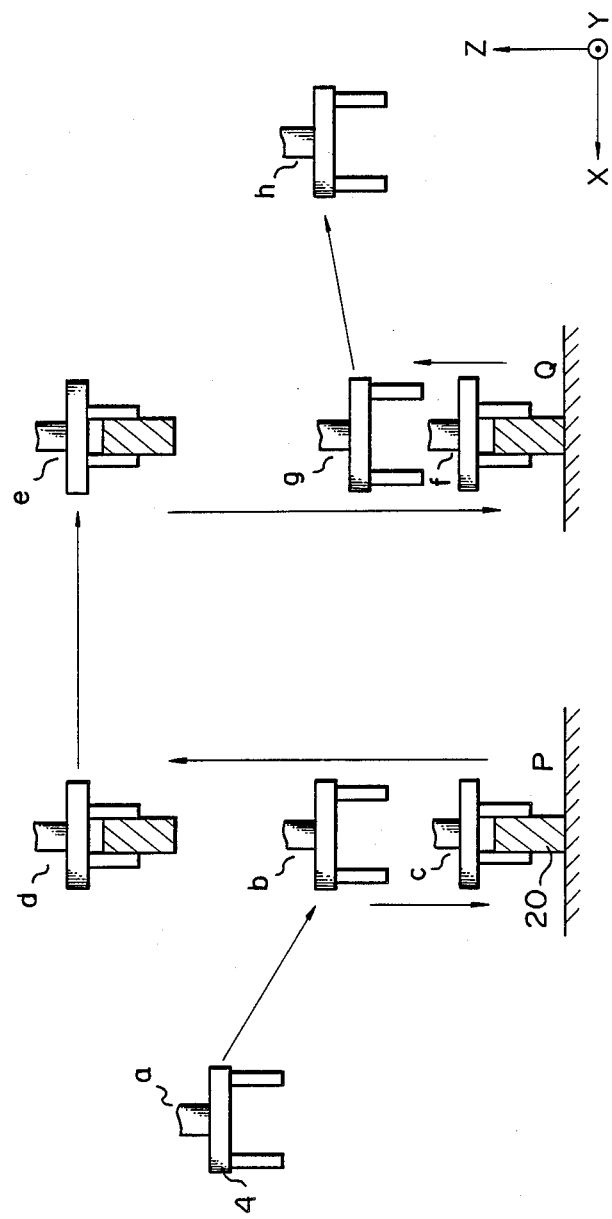
FIG. 15 is a schematic illustration for explaining a motion of a hand (end effector)

FIG. 14 is a flow chart of a teaching procedure for the robot, and FIG. 15 is a schematic illustration explaining the motion of the hand. The operations shown in FIG. 15 will be explained latter.

For example, when an object 20 at the point P is moved to the point Q, the hand 4 is moved from the position "a" to the position "h". As the contents taught to the robot, the teaching procedure as mentioned above will be explained in detail below.

A. First, to teach a start position "a" when the hand 4 is at the position "a", the operator inputs a hand position store command (store command) to the microprocessor 12 by pushing a button on the operator's panel 10. The microprocessor 12 receives this command through the bus line 19, and reads out a present position coordinate "a" (x, y, z) from the hand position detection circuit 14 through the bus line 19, and the present position "a" is stored in the memory 11 as shown in Item 1 of FIG. 16.

B. Next, when the operator grips the hand 4 and applies suitable force to the hand 4 in order to move the hand 4 toward the position "b", this force is detected by the force sensor 5. The force detected by the sensor 5 is sent to the force control unit 15 and is analyzed for each force component of axis $F_x$, $F_y$, and $F_z$ by the force control unit 15. Each follow-up command $PF_x$, $PF_y$, and $PF_z$ is generated by the force control unit 15. By these procedures, the arm drive circuit 16 controls each drive source by servo control, each X, Y and Z axis of the robot is driven in response to the amplitude of each force component, and the arms 7 and 8 are moved by the outputs of the arm drive circuit 16. Accordingly, the hand 4 is moved in the direction of the position "b" by following the manual motion of the operator.

C. When the hand 4 reaches the position "b", the operator removes his hand so that the force added to the hand 4 becomes zero. Accordingly, the follow-up command from the force control unit 15 also becomes zero, the X, Y and Z-axis operation of the robot is stopped, and the motions of the arms 7 and 8 are stopped so that the hand 4 is stopped at the position "b".

D. When the operator inputs the store command through the operator's panel 10, as mentioned above, the processor 12 reads the store command and reads out a present position coordinate "b" (x, y, z) from the hand position detection circuit 14 through the bus line 19, and the present position "b" is stored in the memory 11 as shown in Item 2 of FIG. 16.

E. In the same steps as steps B and C above, the hand 4 at the position "b" is moved to the position "c" by the operator, and in the same step as the step D above, the microprocessor 12 reads the store command and reads out the present position coordinate "c" (x, y, z). The present position "c" is then stored in the memory 11 as shown in Item 3 of FIG. 16. These steps A to E are shown by steps 1 to 6 in FIG. 14.

F. Next, since the hand 4 must grip the object 20 (FIG. 15), the operator inputs a hand close command through the operator's panel, the processor 12 reads this command through the bus line 19, and sends a "hand close" command to the hand open/close unit 17 through the bus line 19. Thus, the hand 4 is closed and can grip the object 20. The command "hand close" in stored in the memory 11 as shown in Item 4 of FIG. 16.

G. By the, same steps as mentioned above, the hand 4 at position "c" is moved to position "d". The coordinate d (x, y, z) at position "d" is stored in the memory 11 as shown in Item 5 of FIG. 16. Next, the hand 4 is moved from position "d" to position "e" by the operator, and the coordinate e (x, y, z) at position "e" is stored in the memory as shown in Item 6 of FIG. 16. The hand 4 at position "e" is then moved the position "f" by the operator, and the coordinate f (x, y, z) at position "f" is stored in the memory 11 as shown in Item 7 of FIG. 16.

H. At position "f", the hand 4 must release the object 20, and so the operator inputs a hand open command through the operator's panel, the processor 12 reads this command through the bus line 19, and sends a "hand open" command to the hand open/close unit 17 through the bus line 19. Thus, the hand 4 is opened and releases the object 20. The command "hand open" is stored in the memory 11 as shown in Item 8 of FIG. 16.

I. By the same steps as mentioned above, the hand 4 at position "f" is moved to position "g" by the operator, and the coordinate g (x, y, z) at position "g" is stored in the memory 11 as shown in Item 9 of FIG. 16. The hand 4 at position "g" is then moved to position "h" by the operator, and the coordinate h (x, y, z) at position "h" is stored in the memory 11 as shown in Item 10 of FIG. 16. These steps F to I are shown by steps 7 to 11 in FIG. 14.

As mentioned above, the teaching procedure (data) is stored in the memory 11 as shown in FIG. 16 by the teaching of a motion route from position "a" to position "h" by the operator. Accordingly, since the force added to the hand 4 is detected by the force sensor 5 and the arms of the robot are moved by the force control, the operator can move the hand 4 by applying only a little force, so that "a direct teach procedure" taught by the operator gripping the hand 4 can be performed with high efficiency and precision.

Next, the playback operation will be explained. When the operator inputs a playback mode by using a button on the operator's panel 10 (FIG. 11), the microprocessor 12 reads the playback mode through the bus line 19 and sequentially reads out the taught data, i.e., commands and data, stored in the memory 11 from the first item 1. When the command regarding the position of the hand 4 is used, the command route of the hand 4 is generated by the corresponding data and the generated command is sent to the position control unit 13 through the bus line 19. Meanwhile, when the command regarding the open/close of the hand 4 is used, the command is applied to the hand open/close unit 17 through the bus line 19 and the hand 4 is opened or closed. The position control unit 13 converts each displacement value $\Delta X$, $\Delta Y$, and $\Delta Z$ of each axis to the pulse trains $V_x$, $V_y$, and $V_z$ at the corresponding frequency, and outputs the position command (speed command) to the arm drive unit 16. By this command, each drive source of each axis is servo-controlled, and the hand 4 can be moved to the taught position.

Another embodiment according to the present invention will be explained in detail below.

Figure 17:
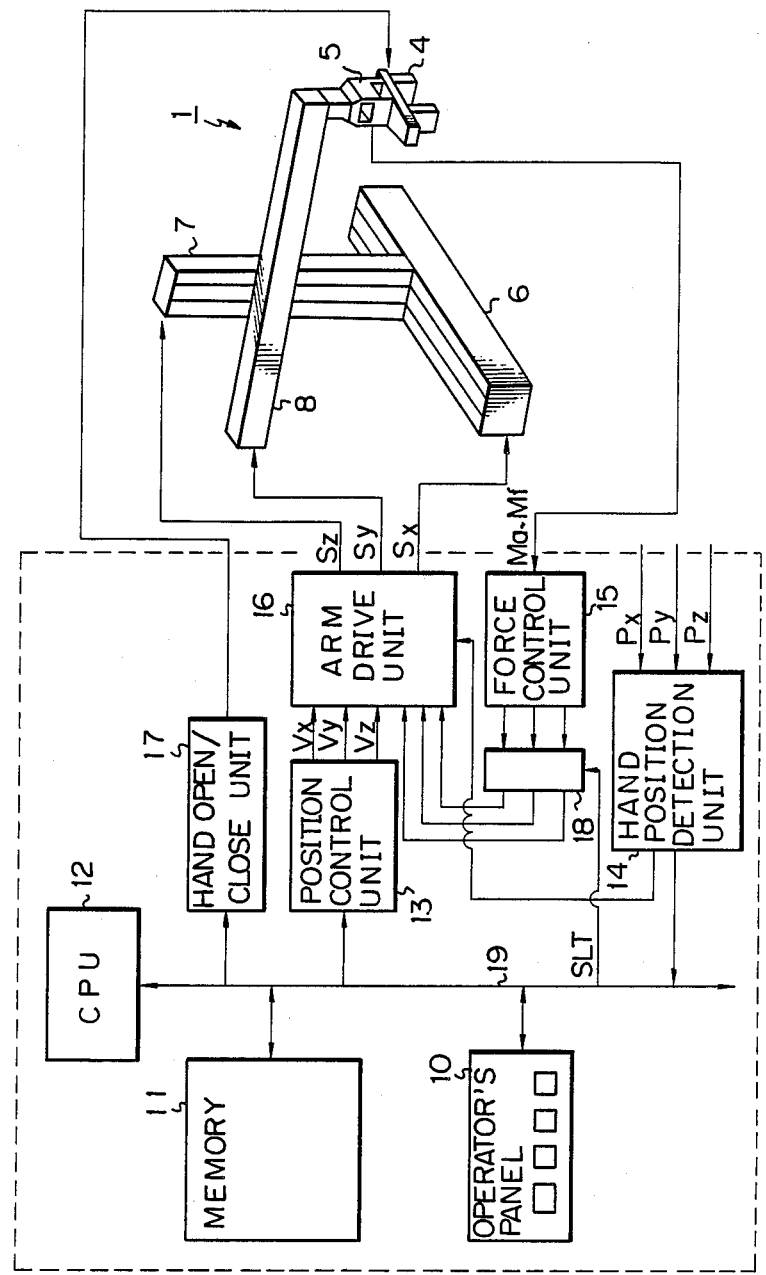
FIG. 17 is a schematic block diagram of a control circuit for a robot according to another embodiment of the present invention.

FIG. 17 is a schematic block diagram of a control circuit of the robot according to another embodiment of the present invention. In FIG. 17, the same reference numerals are attached to the same elements as shown in FIG. 11. Reference numeral 18 is a force component selection unit associated with the force control unit 15. This selection unit 18 selects a particular axis within the follow-up commands $PF_x$, $PF_y$, and $PF_z$ output from the force control unit 15 based on a selection command SLT sent from the microprocessor 12.

Figure 18:
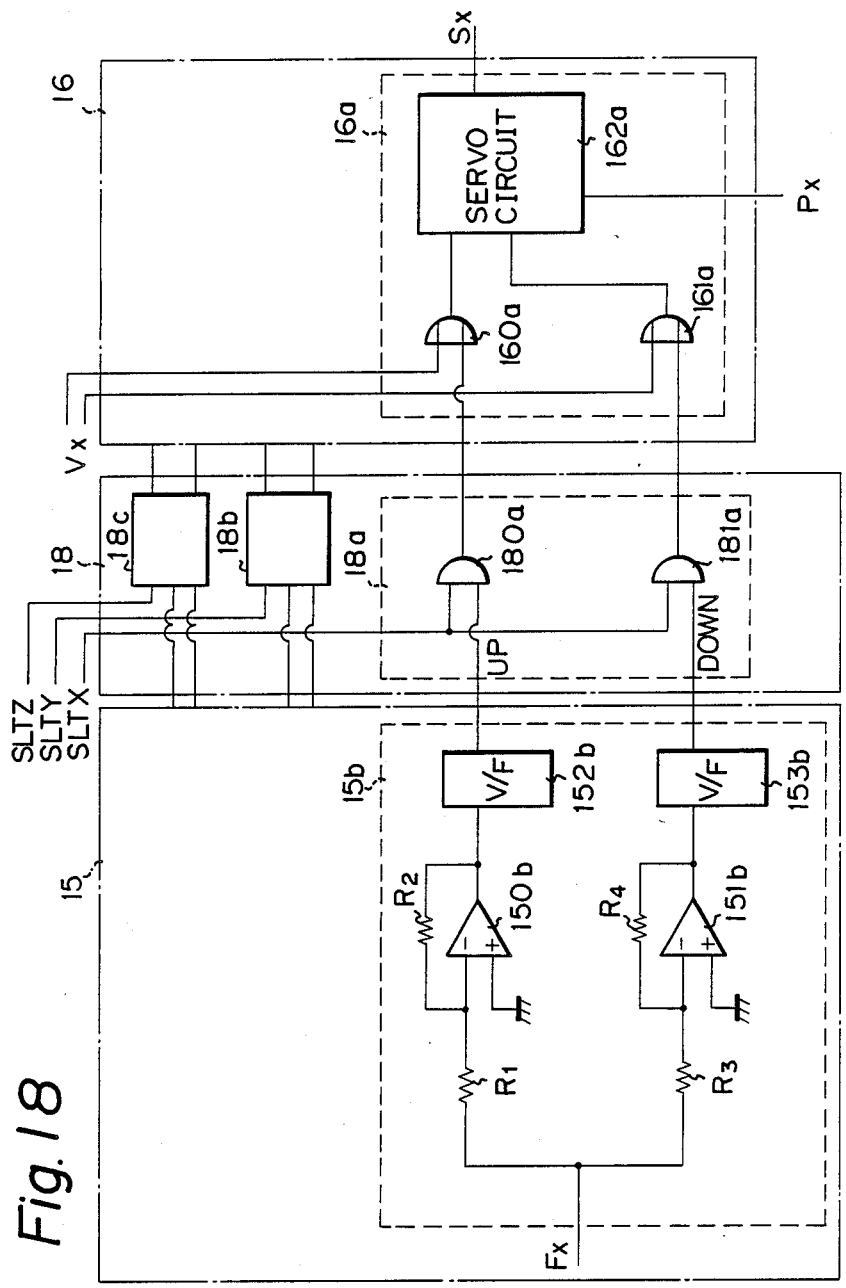
FIG. 18 is a detailed block diagram of a force component selection unit shown in FIG. 17.

FIG. 18 is a detailed block diagram of the force component selection unit 18. Reference numerals 18a, 18b, and 18c are selection circuits connected between the force control unit 15 and the arm drive unit 16. The selection circuit 18a, for example, comprises a pair of AND circuits 180a and 181a, in which each of the gates is turned ON or OFF by the X-axis selection command $SLT_x$. The AND circuit 180a is used for gate-controlling the up-count pulse, the AND circuit 181a is used for gate-controlling the down-count pulse. The selection circuits 18b and 18c have the same structure and function as the selection circuit 18a.

As is obvious from FIG. 17, the force component selection unit 18 is added to the force control unit 15 so that force control of a particular axis is possible and the hand 4 is moved only in the X-Y plane or only in the Z-axis when teaching the motion route.

Figure 19:
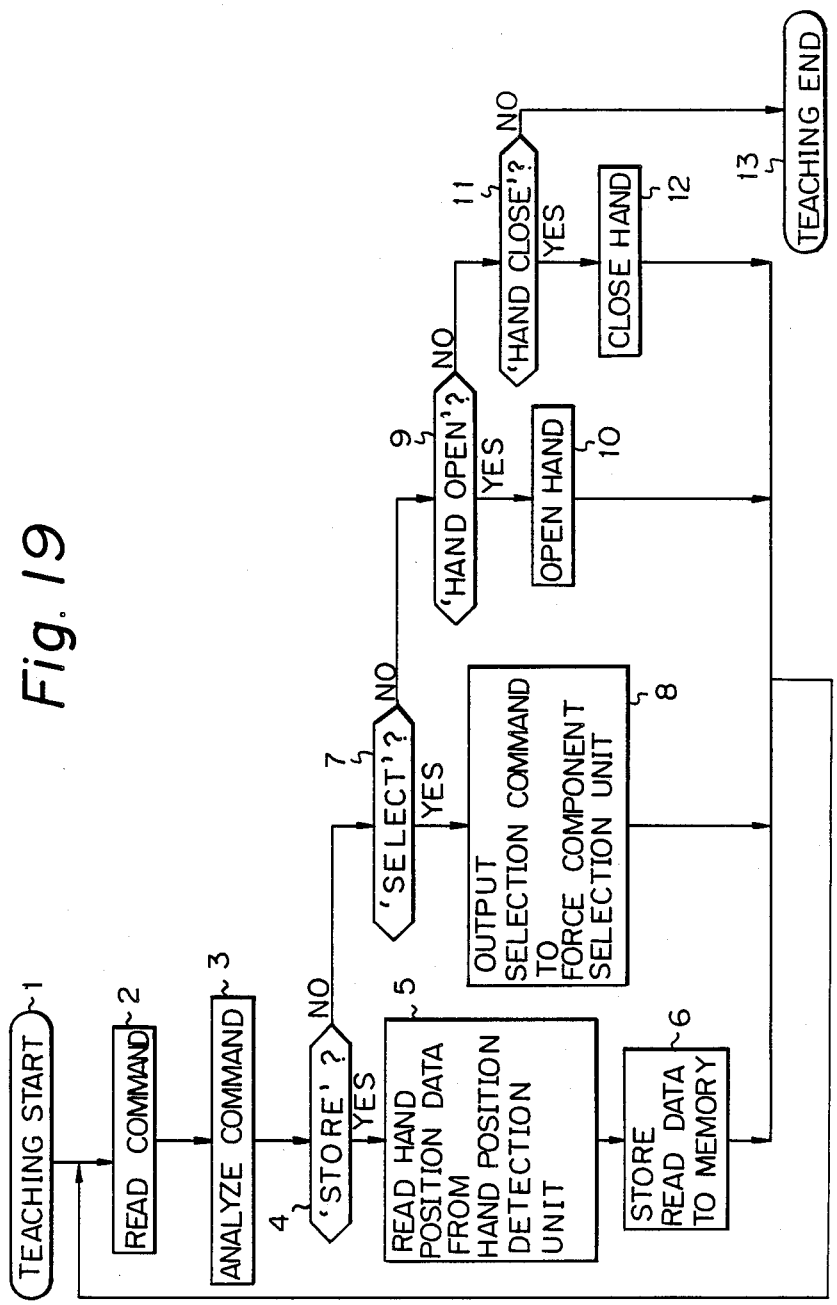
FIG. 19 is another flowchart of a teaching procedure for the robot shown in FIG. 17.
Figure 20:
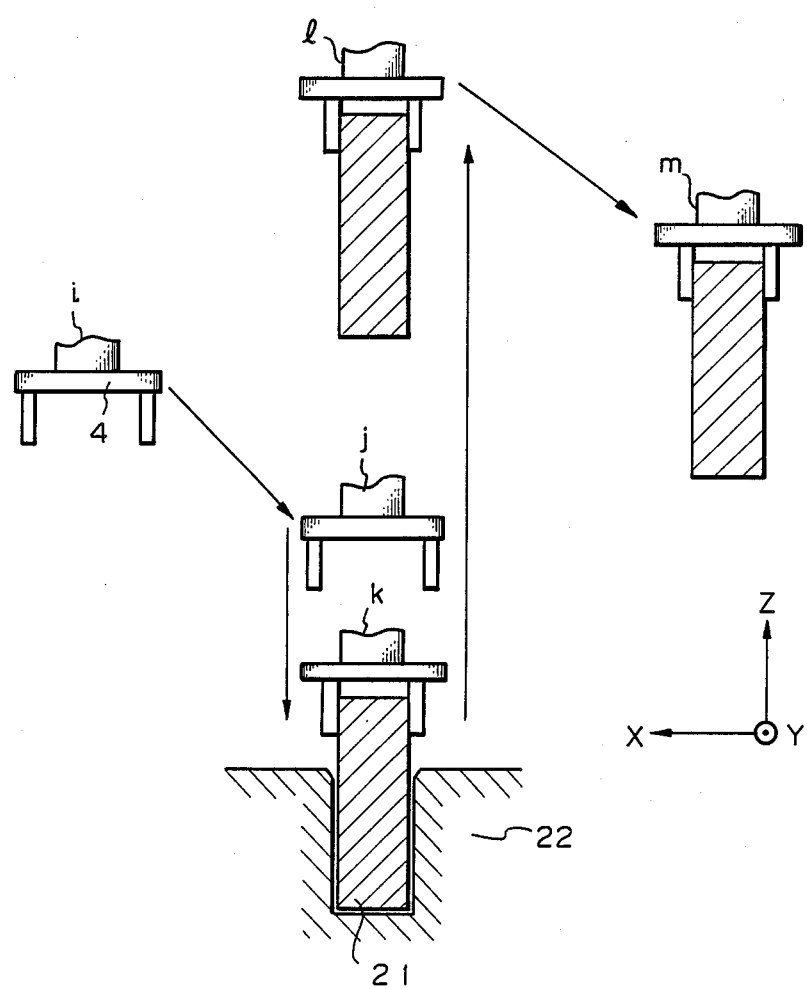
FIGS. 20 and 21 are schematic illustrations explaining the motion of a hand.

FIG. 19 is a flow chart showing the procedure when the function of the selection unit 18 is added, and FIG. 20 is a schematic illustration explaining the motion of the hand; for example, as contents taught to the robot, an explanation will be given of a pull-up procedure to a bar 21 which is fitted in a circular hole provided to a base member 22.

A. First, the operator inputs a selection command and an axis to be selected as a parameter through the operator's panel 10. As the selection command, for exampe, the operator instructs the microprocessor 12 to select from X, Y, and Z (i.e., one of three components). The microprocessor 12 reads and analyzes this command, selects one of the selection circuits 18a to 18c in the force component selection unit 18, and selectively opens the correspondingly one of the gates 180a, 181a in the selection circuits. By these procedures, force control is possible selectively in each of the X, Y and Z-axes.

B. Next, the hand 4 at position "i" is moved to position "k" through position "j" by the operator, and the coordinates of these positions are stored in the memory 11. In these steps, the gain α of the force sensor 5 can be varied between the position "j" and "k". When the hand is moved to the "j" position, the gain α is small, but when the hand is moved to the "k" position the gain α is large because of the resulting soft contact with the object. The operator inputs a hand close command through the operator's panel, the hand 4 is closed, and the bar 21 is gripped by the hand 4. This command is stored in the memory 11.

C. In order to pull-up the bar 21 from the hole of the base member 22 in such a way that it will not touch an inside wall of the hole, the operator inputs the select command and a Z-axis to be selected as the parameter to the microprocessor 12 through the operator's panel 10. The processor 12 reads and analyzes this command, selects only the Z-axis selection circuit 18c in the force component selection unit 18, and opens the gate in the selection circuit. Accordingly, other gates in the X, Y-axis selection circuits 18a and 18b are closed. These procedures make force control of only the Z-axis possible, and the hand 4 is moved only in the Z-axis direction. The steps A to C are shown by steps 1 to 8 in FIG. 19.

D. Next, when the hand 4 is pulled up from position "k" to position "l" by the operator, the hand 4 is moved in only the Z-axis direction and the bar 21 can be smoothly pulled up from the hole without touching the inside wall of the hole. When the hand 4 reaches position "l", the coordinate l (x, y, z) at position "l" is stored in the memory 11.

E. Then, to move the hand 4 from position "l" to position "m" after cancelling the above-mentioned constraint in the X, Y-axis direction, the operator inputs a selection command and an axis to be selected to the microprocessor 12 as a parameter through the operator's panel 10. The operator accordingly instructs the microprocessor 12 to select one of the X, Y, and Z components. The microprocessor 12 reads and analyzes this command, selects the corresponding one of the selection circuits 18a to 18c, and opens the corresponding one of the gates 180a and 181a in the selection circuits. These procedures make selective force control possible in each of the X, Y and Z-axis.

F. Next, the hand 4 at position "l" is moved to position "m", as a teaching procedure by the operator, and the coordinate m (x, y, z) at position "m" is stored in the memory 11. The teaching procedure by the operator is then completed by pushing the "end" button on the operator's panel 10. These steps D to F are shown by steps 9 to 13 in FIG. 19.

As is obvious from the above explanation, the teaching of contrary steps, i.e., teaching the insertion procedures of the bar 21 into the hole, can be performed by reversing the above-mentioned steps.

As explained above, since "direct teaching" is performed in such a way that the operator directly grips the hand 4 and teaches a motion route of the robot to the microprocessor, the fine motion of the robot or the fine fitting of an object can be taught to the robot with a high precision. According to this embodiment, since the particular component in the force added to the hand is selected and controlled by force control, the motion in the particular direction of the hand can be realized easily and can increase the effect of the direction teaching. Moreover, by utilizing the function of the force component selection unit 18, the force control can be selected so that it is used either jointly or not jointly in the playback mode.

Figure 21:
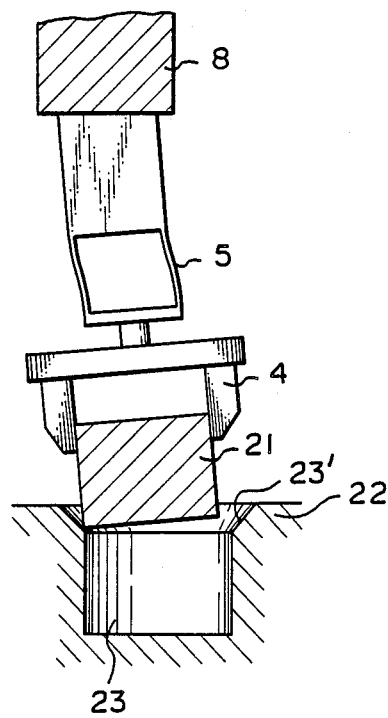

When the force control is used jointly, assuming that the base member 22 has moved out of position, for example, during the fitting work as shown in FIG. 21, the bar 21 can be smoothly fitted into the hole 23 of the base member 22. Namely, when the bar 21 touches the taper portion 23' of the hole 23 and force is applied to the hand 4, since the follow-up command generated by the force control will not add force to the hand 4, the position of the hand 4 is adjusted automatically and the bar 21 is fitted into the hole 23 of the base member 22.

Figure 22:
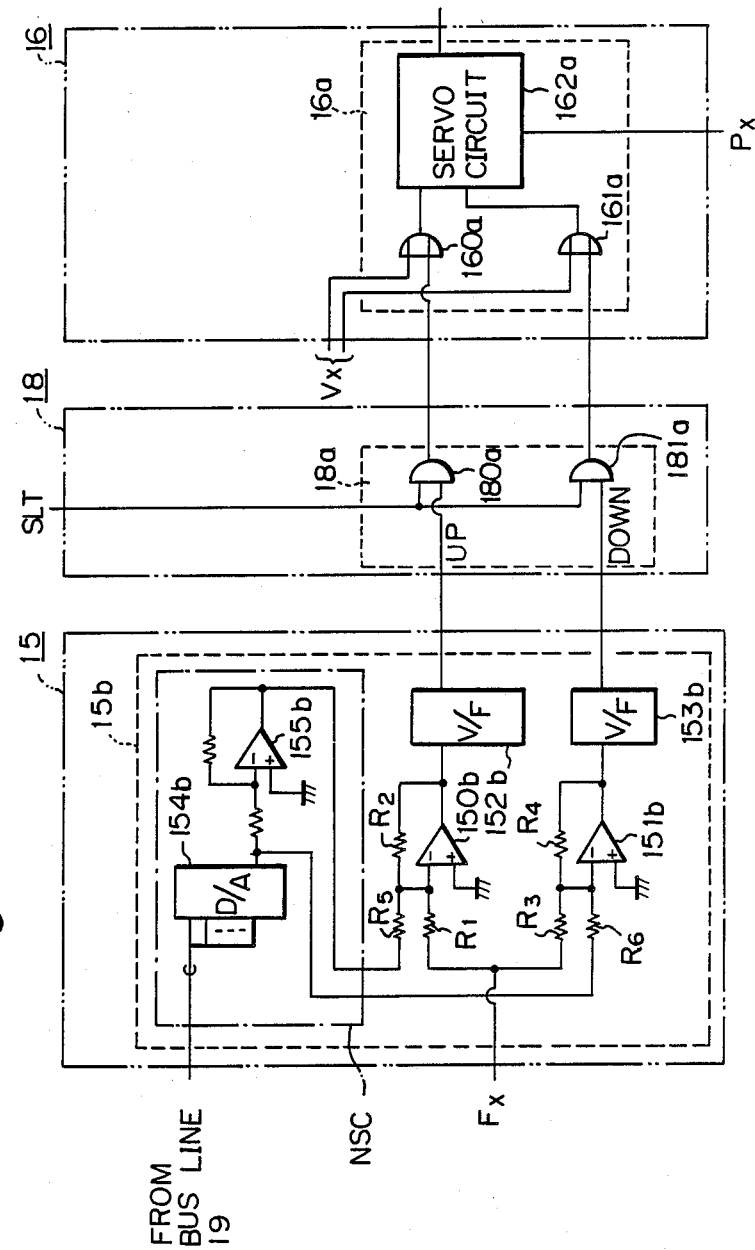
FIG. 22 is a schematic block diagram of still another embodiment of a force control unit shown in FIG. 18.

FIG. 22 is a schematic block diagram of still another embodiment of the force control unit 15 shown in FIG. 18. In FIG. 22, reference letters NSC are an insensitive area generation unit which is provided in each of the follow-up command generation circuits 15b to 15d. This circuit NSC is provided in order to apply an insensitive area to the V/F converters 152b and 153b. Reference numeral 154b is a digital-to-analog ("D/A") converter which converts an insensitive area data set by the processor 12 to an analog value. Reference numeral 155b is an inverting amplifier which inverts the output of the D/A converter 154b, the output of the D/A converter 154b is applied to the amplifier 151b through the resistor $R_6$. The output of the inverting amplifier 155b is applied to the amplifier 150b through the resistor $R_5$. Accordingly, both amplifiers 150b and 151b are operated as an addition amplifiers.

The function of the insensitive area unit NSX will be explained with reference to FIGS. 23A and 23B.

Figure 23A:
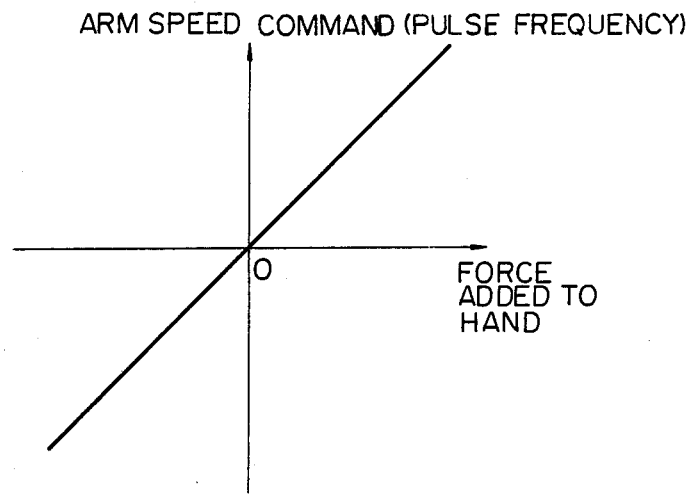
FIGS. 23A and 23B are graphs explaining relationships between a value of arm speed command and a force applied to the hand, having an insensitive area IS provided as shown in FIG. 23B.

Assuming that the force components $F_x$, $F_y$, $F_z$ added to the hand 4 are equivalent to a follow-up command, an amplitude of the component of force, and the follow-up command (pulse frequency) takes on a linear relationship so that each force is controlled so as to converge to zero as shown in FIG. 23A. In this linear relationship, when the operator gives a light touch to the hand 4, a small force is generated from the hand 4. The arms 7 and 8 are slightly displaced by this small force. However, such a high sensitivity is inconvenient for an actual teaching step. Therefore, the processor 12 sets an insensitive are IS to the D/A converter 154b through the bus line 19, the calculation ($F_x$−IS) is performed in the addition amplifier 150b and the calculation ($F_x$+IS) is performed in the addition amplifier 151b. The resultant values are applied to each of the V/F converters 152b and 153b.

Figure 23B:
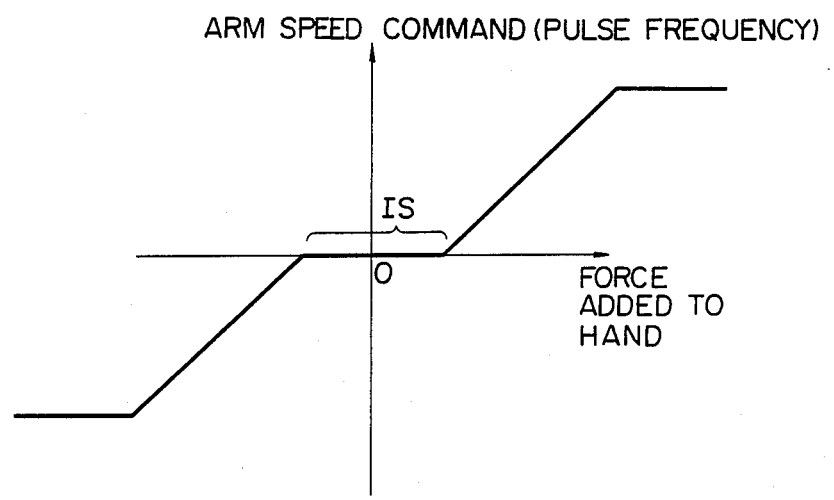

Accordingly, the relationship between the force added to the hand and the follow-up command have an insentive area IS, as shown in FIG. 23B. Even if a small force is applied to the hand 4 and the force sensor 5, the hand 4 and the force sensor 5 do not respond to this small force within the insensitive area, so that the teaching procedures can be stably performed. In FIG. 23B, upper and lower flat lines show negative gain of the force sensor.

This insensitive area can be changed or fixed based on the instructions of the microprocessor 12.

In the above-mentioned embodiment, the explanations are given of the teaching of the hand 4 by using the three-dimensional coordinates for the hand position. However, if the robot is constructed so that the hand 4 can rotate relatively to the arm 8, a rotational coordinate of the hand 4 also can be taught by the operator. In this case, the force control unit 15 calculates not only the formulas 23, 24, and 25, but also the formulas 26 and 27, and a rotational follow-up command is generated from these calculations in the force control unit 15.

FIG. 24 is a schematic block diagram of a control circuit of the robot having a twist detection function added to the control circuit shown in FIG. 11. In this case, the force sensor 5 is used with the sensor 41 as shown in FIG. 8B. The output $P_\theta$ of the encoder of the DC motor is applied to the hand position detection unit 14, and the follow-up displacement $PF_\theta$ is output from the force control unit 15. The arm drive unit 16 drives each drive source based on the commanded displacement $V_\theta$ from the position control unit 13 and the follow-up displacement $PF_\theta$. The drive signal $S_\theta$ is applied to a $\theta$-axis drive motor (not shown). Accordingly, this robot comprises four axes, i.e., X, Y, Z and $\theta$-axis.

Figure 25:
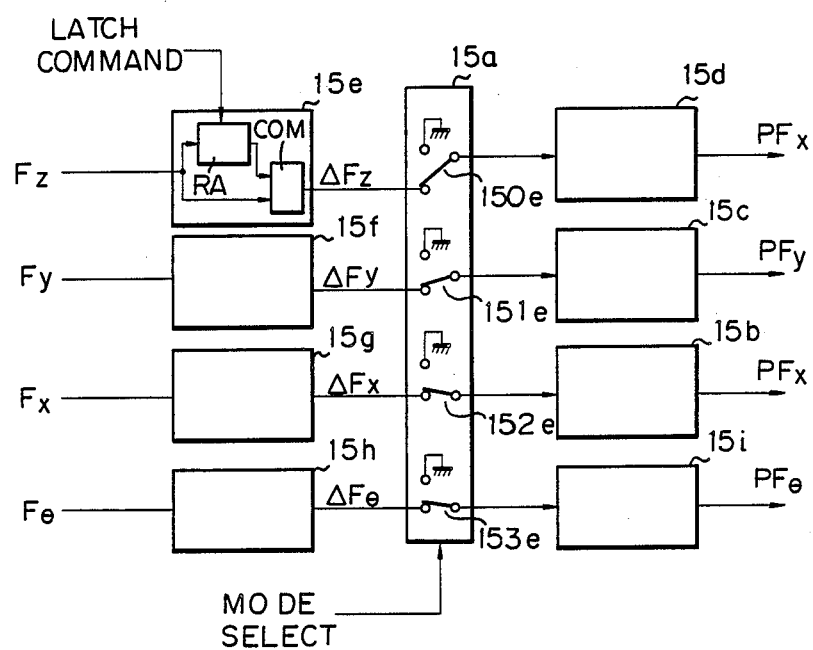
FIG. 25 is a block diagram of a force control unit shown in FIG. 24.

FIG. 25 is a block diagram of the force control unilt 15 shown in FIG. 24. In FIG. 25, as mentioned above, the reference numeral 15a is a selection circuit switched by a force control mode select signal. This circuit comprises contact points 150e to 153e corresponding to each axis. Reference numerals 15d to 15i identify follow-up command generating circuits which output the follow-up commands $PF_x$, $PF_y$, $PF_z$ and $PF_\theta$ of pulse train corresponding to control commands $\Delta F_x$, $\Delta F_y$, $\Delta F_z$ and $\Delta F_\theta$ from the selection circuit 15a. Reference numerals 15e to 15h are control command generating circuits which each comprise a latch circuit RA for latching the corresponding force $F_x$, $F_y$, $F_z$ and $F_\theta$ from the force sensor 5 based on a latch command and a comparator COM for generating the control commands $\Delta F_x$, $\Delta F_y$, $\Delta F_z$, and $\Delta F_\theta$ based on the difference between the contents of the latch circuit and the respectively forces $F_x$, $F_y$, $F_z$, and $F_\theta$. In the force control mode, the selection circuit 15a connects the control command generating circuits 15e to 15h to the follow-up command generating circuits 15d, 15c, 15b, and 15i. When the content of the latch circuit RA becomes zero, each motor drives the hand 4 so that zero force is added to the hand 4. By using this latch circuit, it is possible to easily move a weighty object manually because the output of the force sensor can be latched by the latch circuit as an offset.

Figure 26:
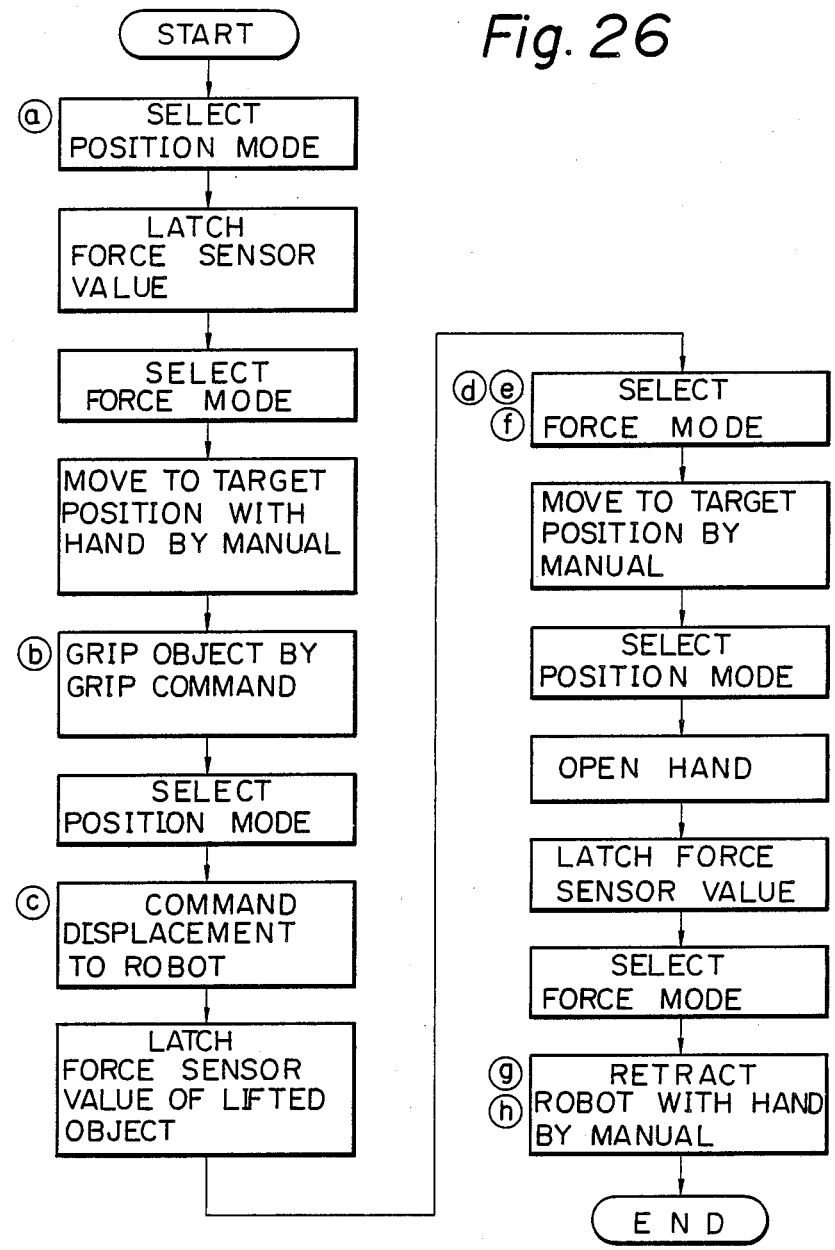
FIG. 26 is a flowchart of a teaching procedure for the robot shown FIG. 15.

FIG. 26 is a flowchart of a teaching procedure for the robot shown in FIG. 15.

In FIGS. 15 and 26, (a), the operator selects the position mode through the operator's panel, and the microprocessor latches the output of the force sensor value to the latch circuit. Accordingly, only the weight of the hand 4 is latched to the latch circuit RA. Next, the operator selects a force mode, and moves manually moves the hand to the target position by directly gripping the hand; (b) the operator applies the grip command to the robot for gripping the object 20, and selects a position mode; (c), the operator inputs a displacement value command for the hand to the robot. The microprocessor 12 disconnets between the circuit 15e to 15h and the circuit 15b to 15i so that the force control can no longer be performed. Next, the microprocessor applies a latch command to the latch circuit RA. The latch circuit latches the force sensor value of the lifted object 20. At (d,e,f), the operator selects the force mode and moves to the target position manually. Next, the operator selects the position mode, and the hand is opened. The latch circuit latches the force sensor value. The operator selects the force mode and retracts the robot with the hand manually.

Figure 27A:
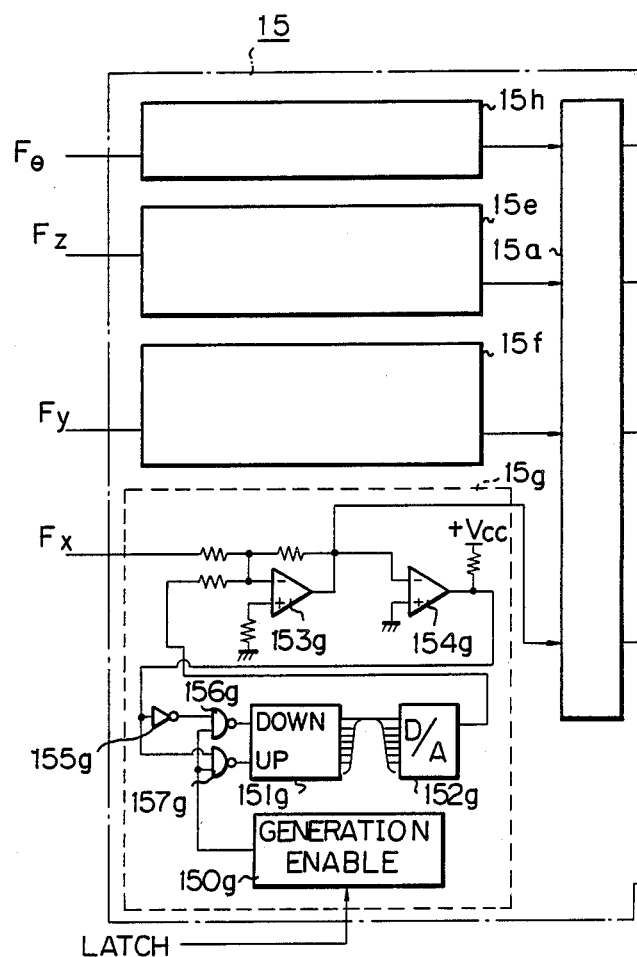
FIG. 27 illustrates the relationship of FIGS. 27A and 27B which together comprise a detailed block diagram of a force control unit and the arm driving unit shown in FIG. 24.
Figure 27B:
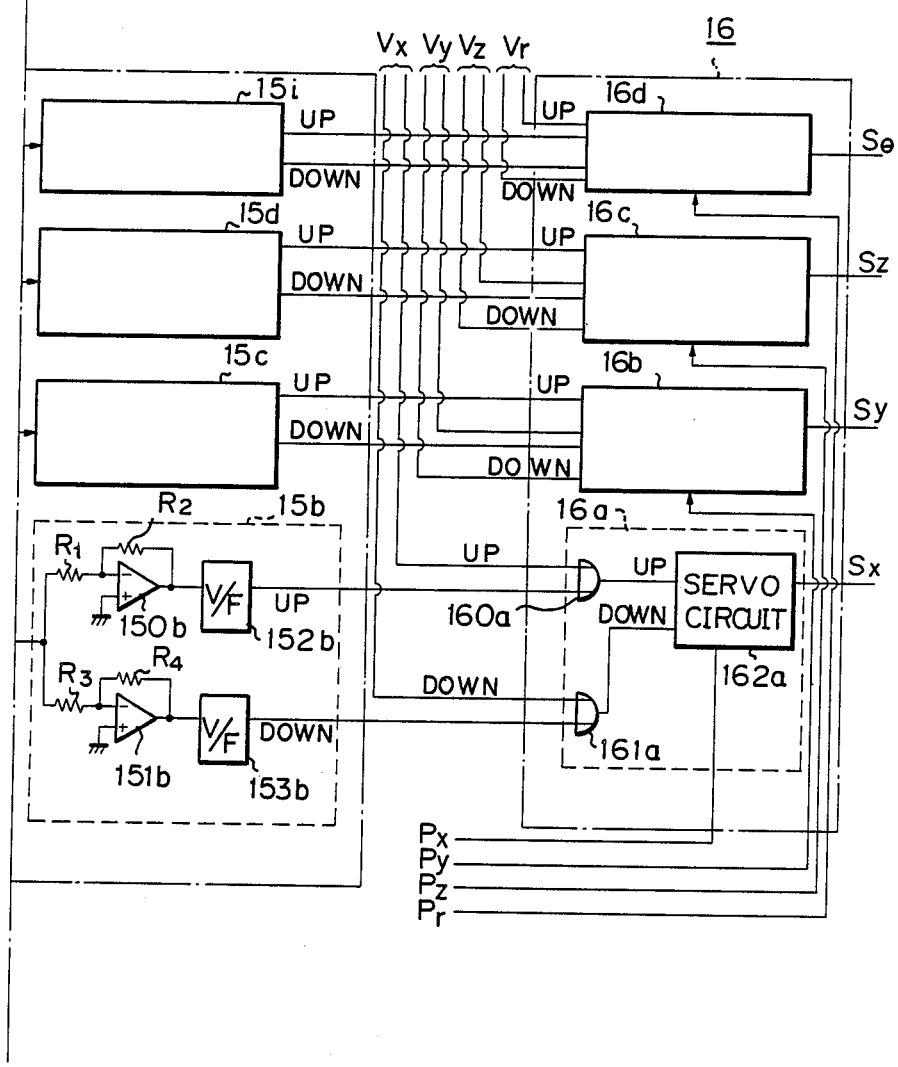

FIG. 27 illustrates the relationship of FIGS. 27A and 27B which, in the composite, comprise a detailed block diagram of the force control unit 15 and the arm drive unit 16 shown in FIG. 24. As is obvious from the drawing, the control command generating circuit 15g, for example, comprises an oscillator 150g which outputs the pulse in response to the latch command from the microprocessor 12, a counter 151g which up-counts or down-counts the pulse from the oscillator 150g, a digital-to-analog converter 152g which converts the digital value of the counter 151g to an analog value, an operational amplifier 153g which obtains the difference between the output of force sensor 5 and the output of the D/A converter 152g, an inverting amplifier 154g which inverts the output of the amplifier 153g, an inverting circuit 155g which inverts the control output of the inverting amplifier 154g, and a pair of NAND gates 156g and 157g which control the input to the counter 151g.

FIG. 28 is a simplified, perspective view of the structure of a Cartesian co-ordinate type robot having multi-sensors, for example, a displacement sensor consisting of an ultra-sonic sensor, a force sensor, and limit sensors. In FIG. 28, the limit sensors 67 are used for detecting the displacement limitation of the X-axis. The displacement sensor is used for detecting the object by using ultra-sonic waves for three-dimensions. This sensor is a non-contact sensor which can detect the distance between the object and the robot. When the robot approaches the object within the extent of the predetermined distance, the apparent stiffness of the robot is changed to a small value.

In this type robot, the robot itself is controlled by a strong stiffness and response in the position control mode. This is to avoid a plurality of sensor signals being fed back to the robot, since this causes the operation of the robot to become unstable. Each of the sensor signals is input to the force control unit and arm drive unit after analyzing each coordinate component.

Figure 29:
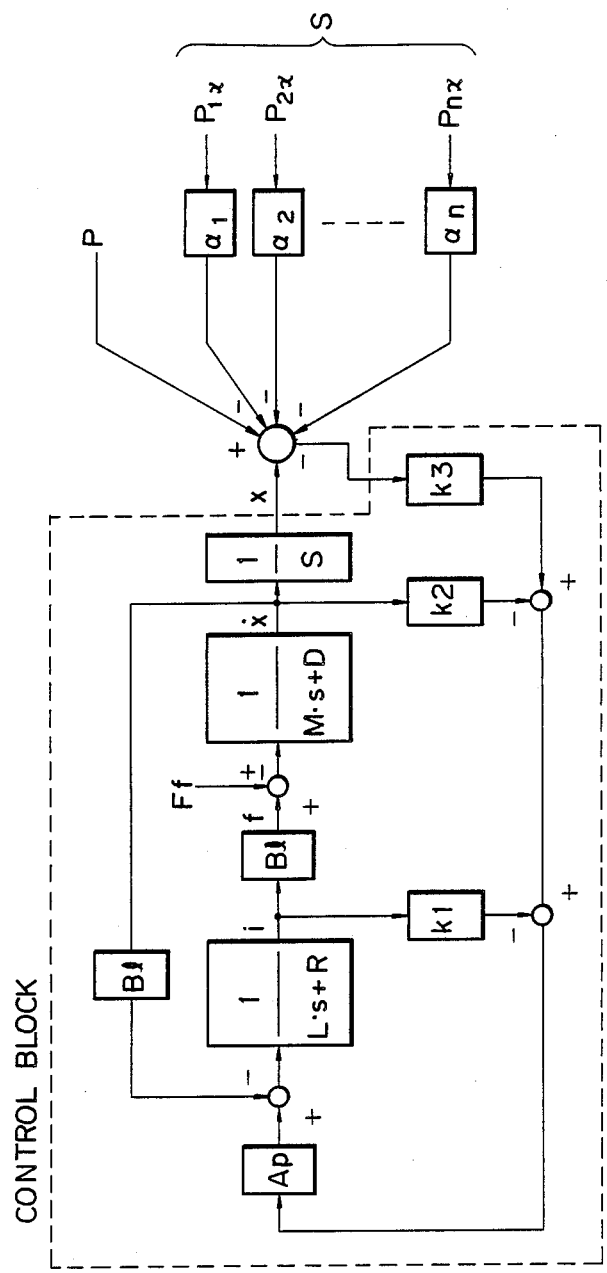
FIG. 29 is a block diagram of a basic control system block wherein multisensors are used in the basic control system of the block diagram shown in FIG. 4A.

FIG. 29 is a diagram of a basic control block for a system in which multisensors are used, as in FIG. 28. In FIG. 29, $a_1$ to $a_n$ are multiple constants.

A transfer function in this case is given by the following formula based on formula (11).

$$\frac{X(s)}{P(s) - \{a_1 P_{1x}(s) + a_2 P_{2x}(s) + \ldots + a_n P_{nx}(s)\}} = \frac{Bl \cdot k3/k1}{M \cdot s^2 + (Bl \cdot k2/k1 + D) \cdot s + Bl \cdot k3/k1} \quad (11')$$

A generating force F(s) by the DC motor is obtained from the formula (11') as follows.

$$F(s) = \{P(s) - (a_1 P_{1x}(s) + \ldots + a_n P_{nx}(s)) - X(s)\} \times Bl \cdot k3/k1$$

When there are no obstacles between the hand and the object, no sensor signals are input to the control block and X(s) is equal to P(s). Accordingly, the generating force F(s) by the DC motor becomes zero.

When there is an obstacle between the hand and the object and the obstacle is detected by the sensor m, a generating force F(s) is given by the following formula.

$$F(s) = \{P(s) - \alpha_m P_{mx}(s) - X(s)\} \cdot Bl \cdot k3/k1$$

Accordingly, the hand of the robot 1 stops at the position indicated by the following formula:

$$X(s) = P(s) - \alpha_m P_{mx}(s)$$

or the hand of the robot is in contact with the obstacle with the force F(s).

The robot 1 according to the present invention can itself take a route around the obstacle as shown in FIG. 6B. Moreover, the robot 1 can profile along the outer line of the object. These motions of the robot are both determined by adjusting the multiple constants $\alpha_1$ to $\alpha_n$.

As is obvious from formula (11'), since whether the sensor signals $P_{1x}$ to $P_{nx}$ are linear or non-linear does not effect the stability of the control system, any kind of sensor, for example, a contact switch, or a non-contact displacement sensor ultra-sonic wave sensor, or a limit sensor such as an on-off switch can be used as the sensors according to the present invention.

Figure 30:
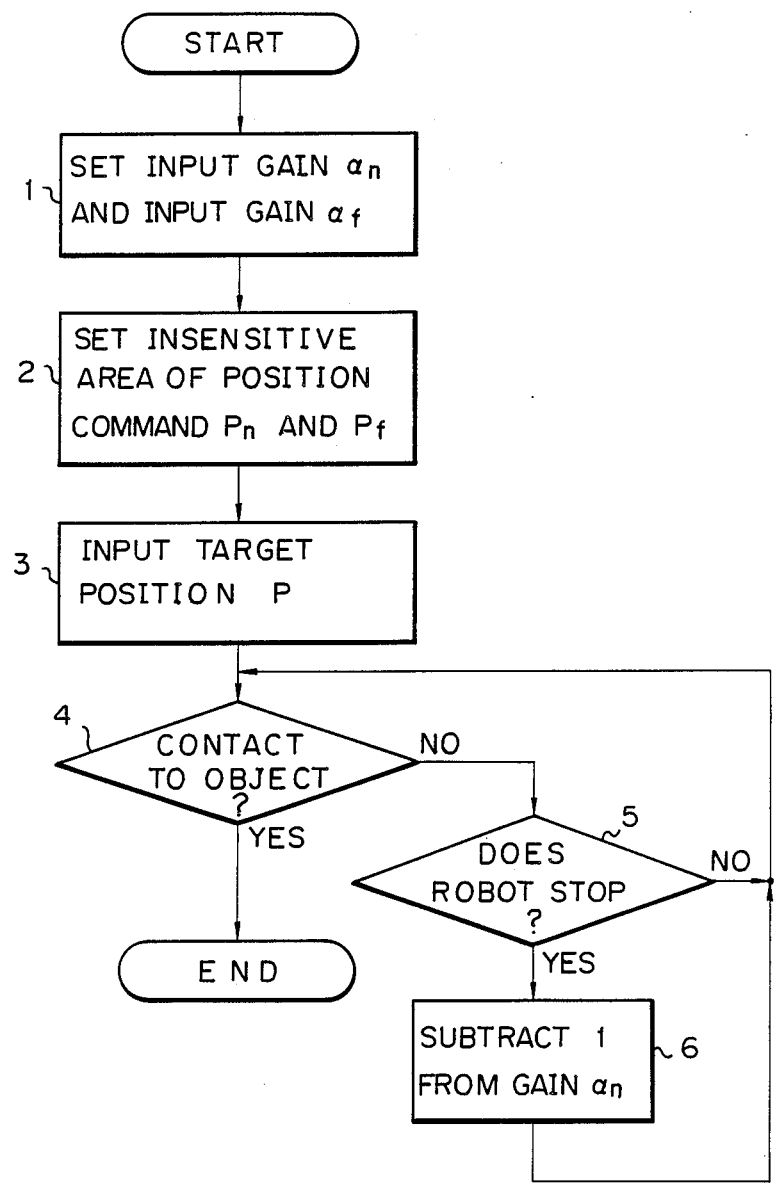
FIG. 30 is a flowchart of basic control functions for the robot shown in FIG. 28.
Figure 31:
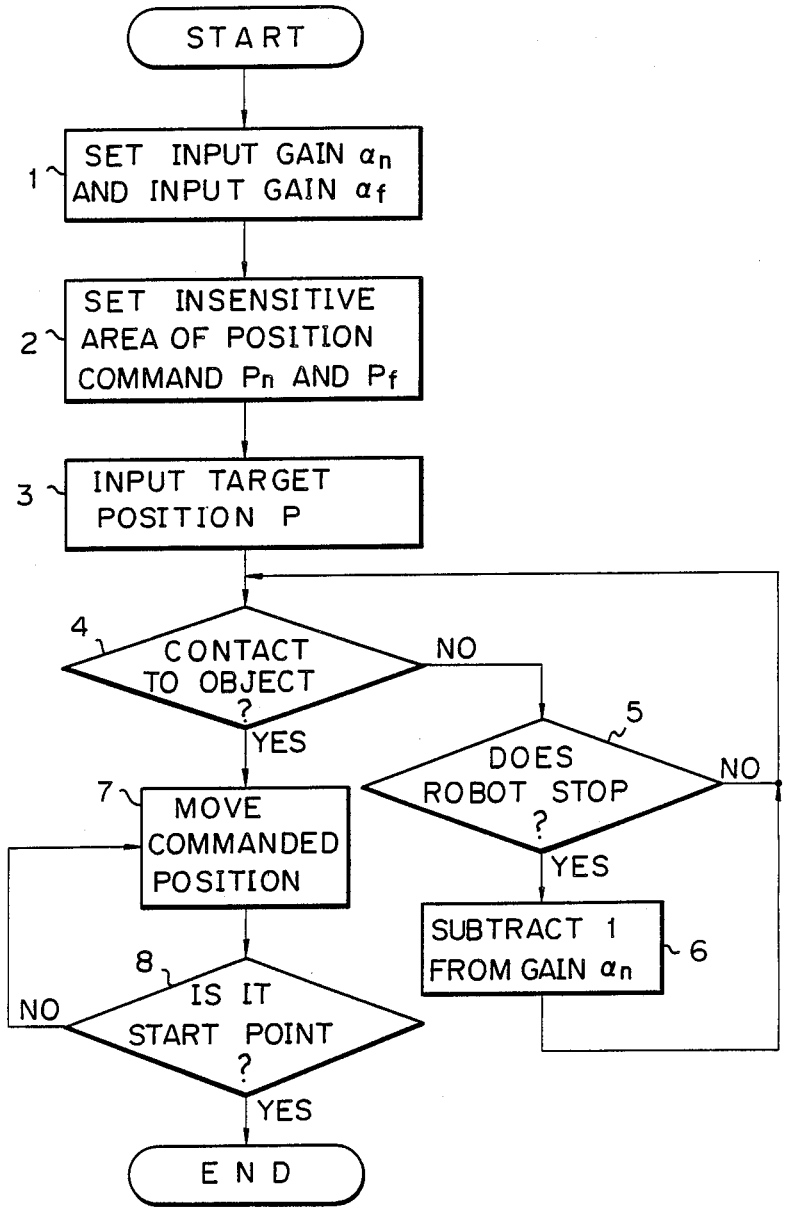
FIG. 31 is a flowchart of further basic control functions for the robot shown in FIG. 28.

FIGS. 30 and 31 are flowcharts of basic controls for the robot shown in FIG. 28. As explained in the formula (11'), when no external sensor signals are applied, the robot is controlled by the position control mode. When external sensor signals are applied, the robot speed is reduced by the input signal of the non-contact displacement sensor and the force sensor can be placed in contact with the object with a so-called "soft landing". Moreover, when the input gain $\alpha_f$ of the force sensor is set to a relatively large value, accurate force control by the contact force is possible within the extent of the insensitive area. In the flowchart, the input gain $\alpha_n$ of the displacement sensor and the input gain $\alpha_f$ of the force sensor are set (step 1). The insensitive area of the displacement command $P_n$ (non-contact displacement sensor) and $P_f$ (force sensor) are set (step 2). The target position P is input (step 3). When the sensors do not make contact with the object, it is determined whether or not the robot is stopped. The flowchart of FIG. 31 shows the case wherein the target position P is moved. This flowchart is used in the case of a profiling operation, as shown in FIG. 6A.

Figure 32:
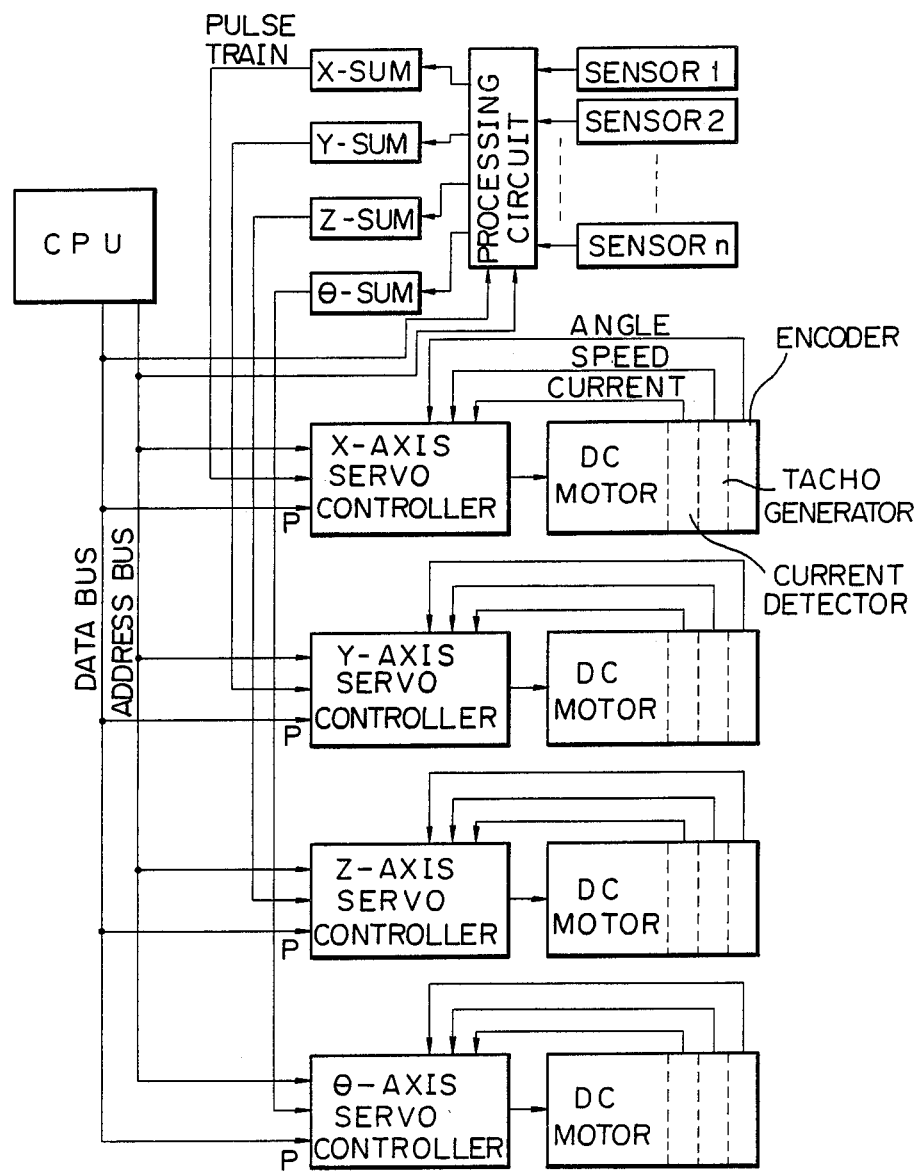
FIG. 32 is a block diagam of a basic control system for the robot shown in FIG. 28.

FIG. 32 is a basic control block diagram of the force control unit and arm drive unit in the case of multisensors. In FIG. 32, sensors 1 to n are, for example, a force sensor, a limit sensor, a non-contact displacement sensor, and the like. Both linear and non-linear sensors can be used for these sensors. The processing circuit is used for setting the insensitive area and separating each of the force components for the X, Y, Z and $\theta$-axes. Each of the servo controllers for the X, Y, Z and $\theta$-axes is used for controlling each encoder, tachogenerator, and current detector of the DC motor based on each pulse train generated from each summing circuit. The output of the encoder indicating the angle, of the DC motor, the output of the tachogenerator indicating the speed, and the output of the detector indicating the current are fed back to each of the servo controllers.

Figure 33:
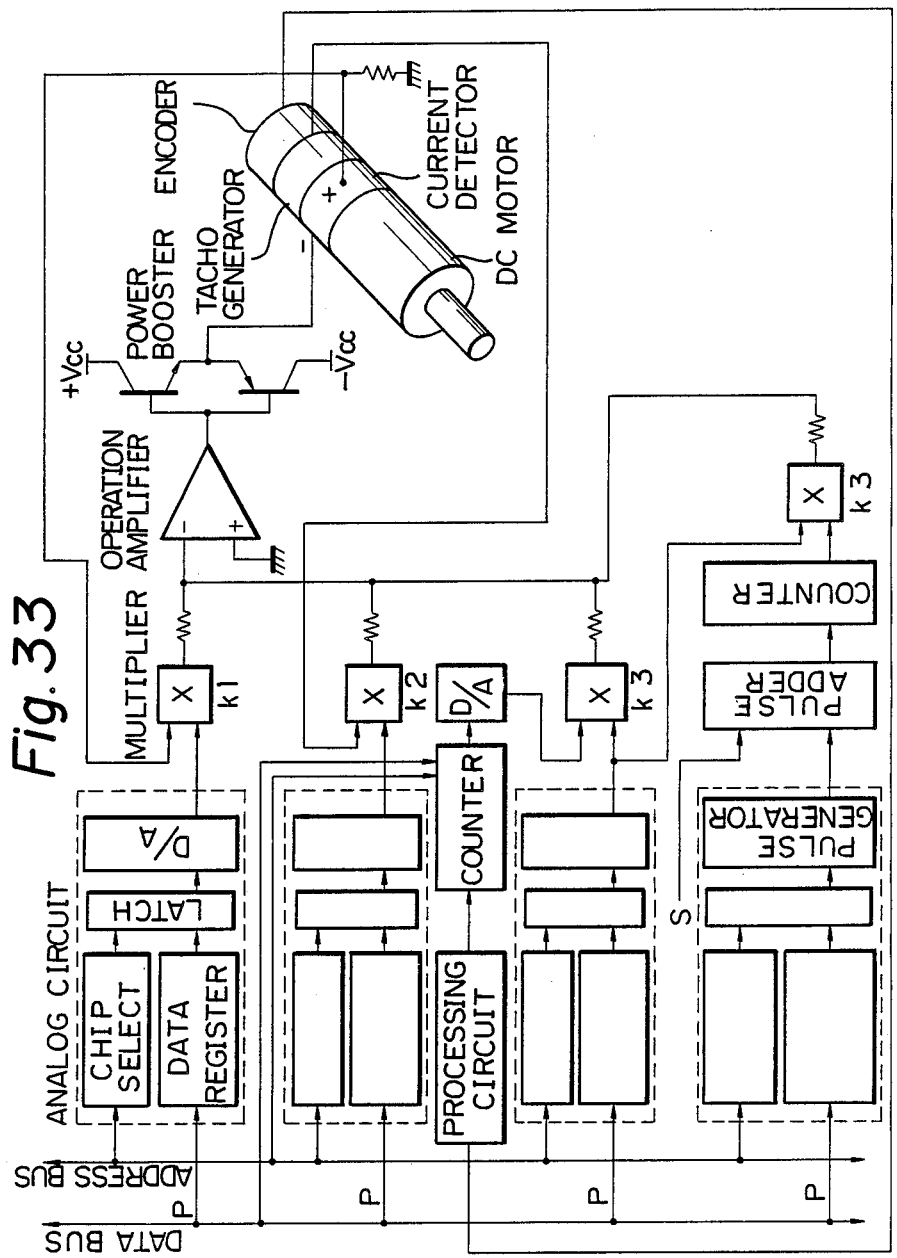
FIG. 33 is a detailed control circuit for the DC motor shown in FIG. 32.

FIG. 33 is a detailed control circuit of a servo controller, for example, the X-axis servo controller. The analog circuit comprises a chip selection ("CHIP SELECT") circuit, a data register, a latch circuit ("LATCH"), and a D/A converter. The chip selection circuit comprises AND gates and is used for opening the gate on coincidence with the address data. The data register always inputs and latchs the data from the data bus when the address is selected. The D/A converter is used for converting the digital latched data to the analog latched data and outputs the data to the multiplier. The multiplier multiplies the output of the DC motor by k1, k2 or k3, and inputs this to the operational ("OPERATION") amplifier. The power booster amplifies this data and outputs it to the DC motor for controlling the motor. The pulse adder adds the pulse of the sensor signal S to the data P, as converted to a pulse train by the pulse generator. The counter multiplies the sum of the pulses of the sensor signal S and the pulses of the data by k3 and outputs this to the operational amplifier.

Figure 34:
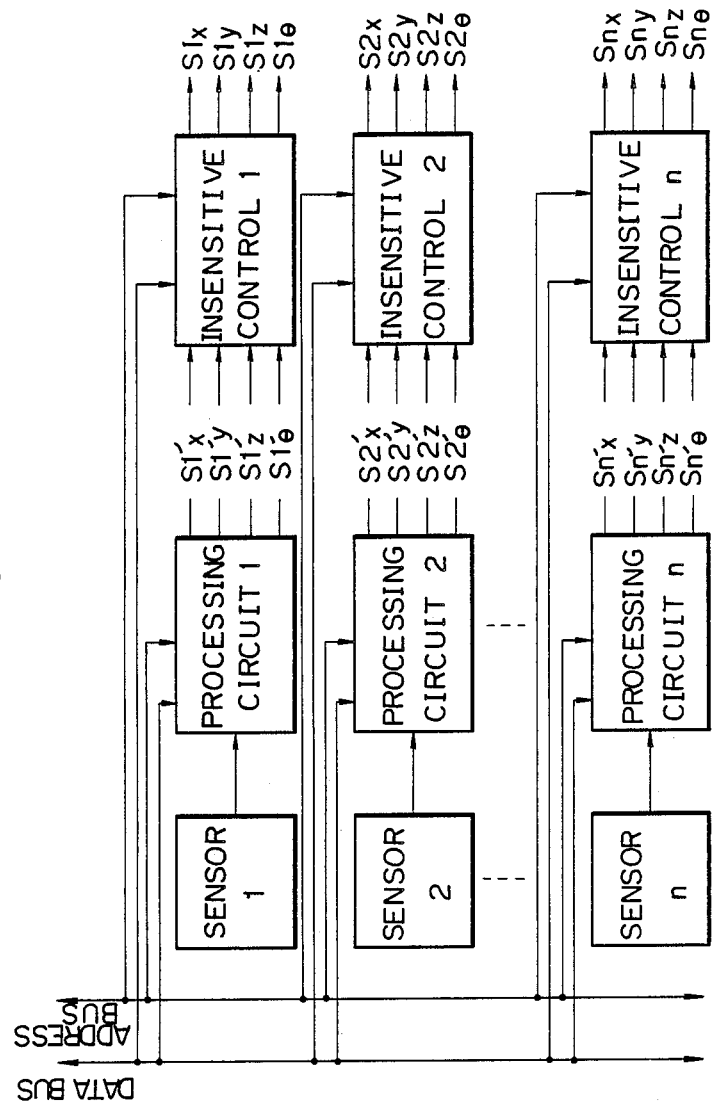
FIG. 34 is a detailed block diagram of the processing circuit for sensors shown in FIG. 32.

FIG. 34 is a detailed block diagram of the processing circuit shown in FIG. 32. In FIG. 34, the reference letters S1'x, S1'y, S1'z, S1'$\theta$ to Sn'x, Sn'y, Sn'z, Sn'$\theta$ are signals which are not processed by the insensitive area processing circuits, and the reference numerals S1x, S1y, S1z, S1$\theta$ to Snx, Sny, Snz, Sn$\theta$ are processing signals which are processed by the insensitive area processing circuits. The insentive area of the insensitive controller is controlled by the CPU through the data and address buses.

Figure 5:
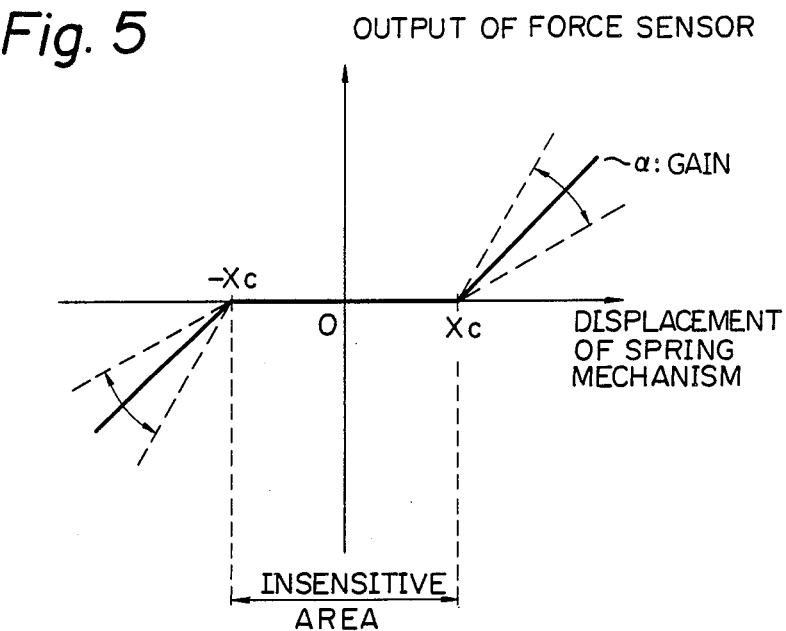
FIG. 5 is a graph explaining the relationship between an output of a force sensor and the displacement of a spring mechanism and having an insensitive area, according to the present invention.
Figure 35:
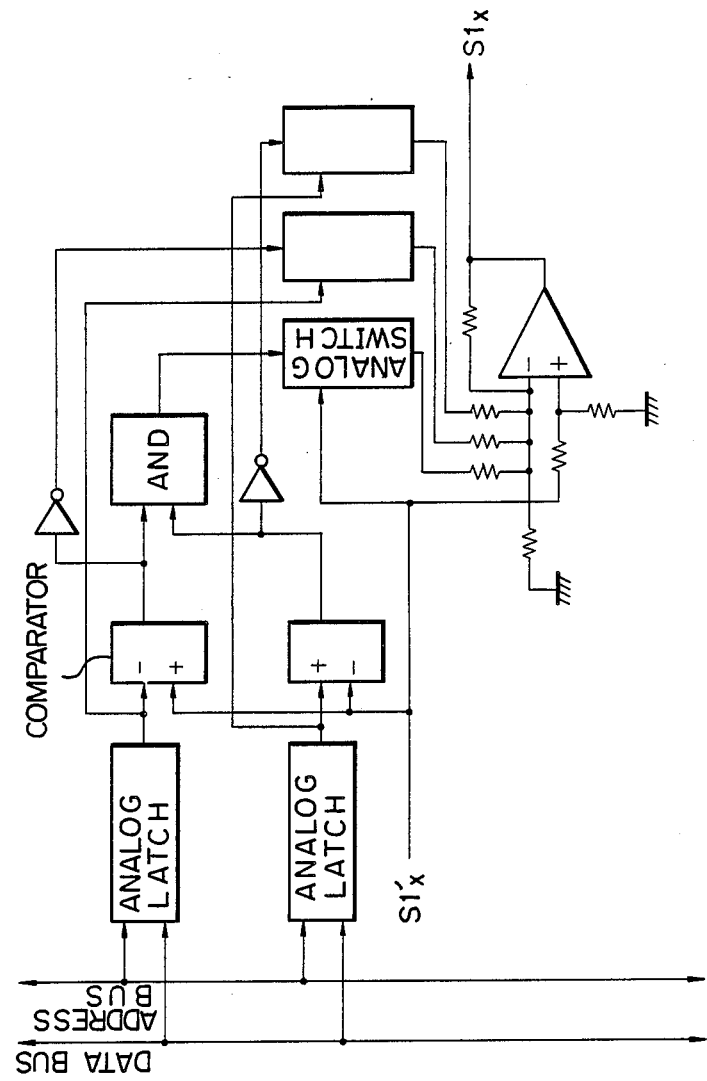
FIG. 35 is a detailed circuit schematic of an insensitive area setting circuit shown in FIG. 34.

FIG. 35 is a detailed circuit of the insensitive area setting circuit shown in FIG. 34. In FIG. 35, the insensitive area is applied to the non-processed signal S1'x by this circuit, and the processed signal S1x is output from the operational amplifier. The upper and lower limits of the insensitive area are set by the analog latch circuit based on the command from the CPU and converted to the analog signal. This analog signal is compared with the non-processed signal by the comparator. Each of the analog switches is opened or closed in response to the output of each comparator so that the characteristic curve having the insensitive area as shown in FIGS. 5 and 23B is output from the operational amplifier.

Figure 36:
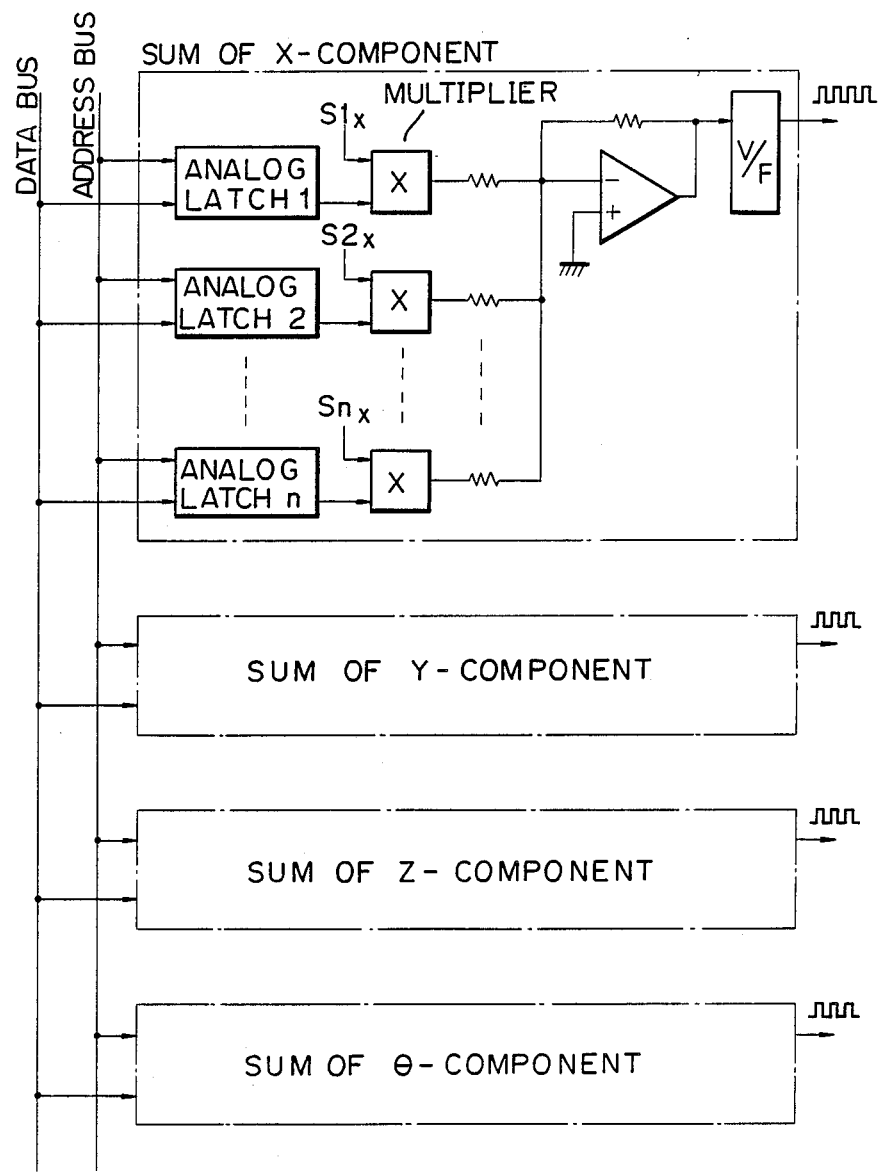
FIG. 36 is a detailed circuit diagram of the X-sum circuit shown in FIG. 32.

FIG. 36 is a detailed diagram of the X-sum circuit shown in FIG. 32. In FIG. 36, the processing signal S1x is input to the multiplier. The analog latch circuit is the same as that shown in FIG. 33. The multiplied voltage signal is converted to the digital pulse train and output to the X-axis servo controller.

FIG. 37 is a flowchart of a basic control of the robot shown in FIG. 28. As is obvious from the above-explanation the basic operation of this robot is controlled by the mechanical impedance (mechanical compliance). Accordingly, these type of robots can be called "impedance control robots". The CPU sets all gains $\alpha$ and loads them to the servo controller through the data and address bus (step 1). The gain $\alpha$ is determined and stored in the internal memory corresponding to the contents of the work. The insensitive area is also set and loaded to the servo controller (step 2). The CPU checks the change of the gain or insensitive area in response to the sensor signal (step 4). When these is no change of the gain, the CPU checks the moving speed of the robot (step 7). When the work is not finished, the CPU instructs the operator to carry out manual recovery (steps 8 to 11). Meanwhile, when the gain is changed, the CPU again sets the preferred gain and outputs this gain to the data and address bus (steps 5 to 6).

In all of the above-mentioned embodiments, the descriptions cover only a Cartesian co-ordinate type robot. However, the present invention can be applied to other types of robots, for example, a cylindrical type robot, multi-articulated robot, and the like, by adding only a coordinate conversion circuit.

We claim:

1. A driving system for a movable apparatus comprising:

means for driving the movable apparatus;

first means for detecting environmental information data associated with the movable apparatus and for producing corresponding environmental information data signal outputs, said first means comprising at least one force sensor connected to the movable apparatus for detecting an external force applied thereto and for producing a follow-up displacement command output, means for detecting the current position of the movable apparatus and producing corresponding, detected current position data outputs; and a displacement sensor for detecting the distance, relative to a current position of the movable apparatus, from an obstacle;

second means responsive to the outputs representing the detected, current position data of the movable apparatus and to target position data defining the target position of movement of the movable apparatus, for producing a displacement command signal output; and means responsive to the follow-up displacement command output of said first means and the displacement command signal output of said second means for producing a composite signal and for supplying the composite signal to said driving means for driving the movable apparatus to the target position.

2. A movable apparatus driving system as recited in claim 1, wherein said second output means comprises:
an internal memory;
a microprocessor, associated with said internal memory, having a predetermined program and selectively operative in a teaching mode of operation for storing teaching data in said internal memory, and in a playback mode of operation for reading out teaching data stored in said internal memory and producing motion route command outputs;
position control means responsive to the motion route command outputs from said microprocessor for producing the displacement command output; and
said microprocessor in the teaching mode being responsive to the detected current position outputs for storing the detected position outputs, as a route of movement of the movable apparatus, in the internal memory as stored route of movement teaching data and, in the playback mode, for reading out the stored route of movement teaching data for generating the motion route command outputs.

3. A movable apparatus driving system as recited in claim 2, further comprising:
plural force sensors respectively corresponding to plural, differently oriented and predetermined external component forces which may act on said moveable apparatus for producing corresponding, different, follow-up displacement component command outputs.

4. A driving system as recited in claim 3, further comprising:
means for latching the values of the different external component forces detected by said plural sensors;
means for generating component force control commands responsive to the detected and stored external component forces;
means for comparing the component force control commands with the latched values of the detected, corresponding component forces and producing comparison outputs; and means for controlling the follow-up command generating means in accordance with the results of the comparison outputs.

5. A movable apparatus driving system as recited in claim 4, further comprising selection means for selecting the detected component forces supplied to said latching means.

6. A movable apparatus drive system as claimed in claim 1, wherein said movable apparatus is an arm or arms of a robot.

7. A movable apparatus drive system as claimed in claim 6, wherein said driving means is a direct current motor for driving said arm or arms.

8. A robot control system comprising:
means for driving a robot in accordance with a composite command signal supplied to the driving means;
means associated with a working part of the robot for detecting deflection of the working part produced by an external force applied thereto and producing a detected deflection output;
means for detecting the current position of the working part of the robot and producing a corresponding, detected current position output;
a microprocessor and an associated internal memory for storing a predetermined gain value and for storing position values defining a route of movement of the robot from a first position to a target position;
feedback means responsive to the detected deflection output and including multiplying means, said microprocessor supplying the predetermined gain value stored in the internal memory to said multiplying means and said multiplying means multiplying the detected deflection output by the predetermined gain to produce a deflection feedback command;
said microprocessor being responsive to the detected current position output and to the position values defining a route of movement of the robot from a first position to a target position to define motion route commands;
position control means for producing move commands;
means for generating follow-up displacement commands in response to the outputs of said multiplying means; and
means for adding the motion route commands and the follow-up displcement commands to produce a composite command signal and for supplying the composite command signal to the driving means for driving the robot to the target position.

9. A robot control system as recited in claim 8, further comprising:
means for defining an insensitive area within a predetermined distance from the target position and supplying same as an analog, insensitive area value;
means for converting the output of said multiplier to an analog value;
means for additively combining the analog, insensitive area values with the analog converted output of said multiplier means to disable response to a detected deflected output within the insensitive area.

10. A robot control system as claimed in claim 9, wherein said deflection detecting means comprise a force sensor, a displacement sensor, a limit sensor and a twist force sensor.

11. A robot control system as recited in claim 8, wherein said deflection detecting means comprises a spring mechanism.

12. A robot control system as claimed in claim 11, wherein said spring mechanism is used as a force sensor.

13. A robot control system as claimed in claim 12, wherein said force sensor comprises a flat plate spring in the form of a box, and strain gauges attached to predetermined positions of said flat plate spring for detecting said deflection.

14. A robot control system as claimed in claim 12, wherein said spring mechanism comprises a three dimensional force sensor and a twist force sensor.

15. A robot control system as claimed in claim 8, wherein said predetermined gain is variable.

16. A driving system for a movable aparatus which is to be driven along a route of movement to a predetermined target position, comprising:
means for driving the movable apparatus;
position control means for generating a target position command for position control of the movable apparatus and comprising first output means for outputting the target position to the driving means, the driving means responding thereto to drive the movable apparatus to the target position, means for obtaining current position data of the movable apparatus, and a feedback loop for supplying the obtained current position data as a feedback signal to the position control means to generate the target position command for positioning the movable apparatus at the target position as a function of the obtained and fed back current position data;
second output means for detecting environmental information data of the movable apparatus and for producing the detected data multiplied by a predetermined gain as an output; and
means for supplying the output of the second output means for the driving means as a position command to control the driving of the movable apparatus thereby, relative to the predetermined target position.

17. A movable apparatus drive system as claimed in claim 16, wherein said movable apparatus comprises at least one arm of a robot.

18. A movable apparatus driving system as claimed in claim 17 further comprising an internal memory having a predetermined program and teaching data stored therein, said first output means further comprising a processor for reading out the stored teaching data from the internal memory and generating a route of movement of said arm in a playback mode and for generating teaching data and for additionally storing the generated teaching data in said internal memory based on the predetermined program.

19. A movable apparatus drive system as claimed in claim 16, wherein said second output means comprises a force sensor for detecting an external force, and a displacement sensor for detecting a distance relative to an obstacle in the route of movement of said movable apparatus between a current position thereof and said target position thereof.

20. A movable apparatus drive system as claimed in claim 16, wherein said second output means comprises a force sensor for detecting an external force.

21. A movable apparatus drive system as claimed in claim 20, wherein said force sensor comprises a spring mechanism, said spring mechanism comprising a flat plate spring in the form of a box and strain gauges attached to predetrmined positions of said flat plate spring for detecting deflection and producing detected deflection value outputs as the detected data.

22. A movable apparatus drive system as claimed in claim 21, wherein said spring mechanism comprises two sets of flat plate springs.

23. A movable apparatus drive system as claimed in claim 21, wherein the outputs of said strain gauges include an area insensitive to a detected deflection value caused by an external force, the second output means producing a position command based on said insensitive area.

24. A movable apparatus drive system as claimed in claim 16, wherein said second output means comprises a displacement sensor for detecting a distance relative to an obstacle in the route of movement between the current position of said movable apparatus and the target position, and producing detected distance value outputs as the detected data.

25. A movable apparatus drive system as claimed in claim 21, 22 or 24, wherein said predetermined gain is variable.

26. A movable apparatus drive system as claimed in claim 24, wherein the output of said displacement sensor includes an insensitive area, the second output means producing a position command based on said insensitive area.

27. A driving system for at least one arm of a robot which is to be driven along a route of movement to a predetermined target position, comprising:
means for driving at least one arm of the robot, said means comprising a direct current motor for driving said at least one arm;
position control means for generating a target position command for position control of said at least one arm of the robot and comprising first output means for outputting the target position command to the direct current motor, the direct current motor responding thereto to drive said at least one arm to the predetermined target position, means for obtaining current position data of said at least one arm, and a feedback loop for supplying the obtained current position data as a feedback signal to the position control means to generate the target position command for positioning said at least one arm at the target position as a function of the obtained and fed back current position data;
second output means for detecting environmental information data of said at least one arm and for producing the detected data multiplied by a predetermined gain as an output; and
means for supplying the output of the second output means to the direct current motor as a position command to control the driving of said at least one arm thereby, relative to the predetermined target position.

28. A driving system as claimed in claim 27, wherein said second output means comprises a spring mechanism force sensor.

29. A driving system as claimed in claim 28, wherein said force sensor comprises a flat plate spring in the form of a box and strain gauges attached to predetermined positions of said flat plate spring for detecting deflection thereof and producing detected deflection value outputs as the detected data.

30. A driving system as claimed in claim 28, wherein the output of said spring mechanism includes an area insensitive to a detected deflection value caused by an external force, the second output means producing a position command based on said insensitive area.

31. A driving system as claimed in claim 28, wherein said spring mechanism force sensor comprises a three-dimensional force sensor and a twist force sensor.

32. A driving system as claimed in claim 27, wherein the predetermined gain is variable.

33. A driving system as claimed in claim 27, wherein said second output means comprises a plurality of sensors.

* * * * *

UNITED STATES PATENT AND TRADEMARK OFFICE
CERTIFICATE OF CORRECTION

PATENT NO. : 4,791,588
DATED : December 13, 1988
INVENTOR(S) : Nobuhiko Onda et al Page 1 of 5

It is certified that error appears in the above-identified patent and that said Letters Patent is hereby corrected as shown below:

Front page at [57], line 24, change "meachnisum" to --mechanism--.

Col. 1, line 40, after "control" insert --,--.

Col. 2, line 61, change "sice" to --since--.

Col. 4, line 21, change "a" to --the--;
line 35, change "diagam" to --diagram--.

Col. 5, line 27, change "K > Kc," to --K >> Kc,--;
line 29, change "(b 2)" to --(2)--.

Col. 6, line 24, change "controluuntil" to --control until--.

Col. 7, line 22, change "S;" to --S,--;

UNITED STATES PATENT AND TRADEMARK OFFICE
CERTIFICATE OF CORRECTION

PATENT NO. : 4,791,588

DATED : December 13, 1988

INVENTOR(S) : Nobuhiko ONDA et al.

It is certified that error appears in the above-identified patent and that said Letters Patent is hereby corrected as shown below:

Col. 8, line 14, change "~" to -- = --.

Col. 9, line 1, after "ingly," insert --the--;

line 17, change "ad" to --and--;

line 24, change "riven" to --driven--;

line 48, change "55dare" to --55d are--;

line 60, change "force" to --forces--.

Col. 10, line 49, change ";" to --:--;

line 53, delete "the" (first occurrence);

line 64, after "the" (first occurrence) insert --force--;

line 65, change "mounte" to --mounted--;

line 67, after "43c" insert --,--.

Col. 11, line 28, change "," to --31--;

line 54, change "amplidier" to --amplifier--;

line 60, change "posit" to --positive.--.

Col. 13, line 67, after "axes" insert --,--.

UNITED STATES PATENT AND TRADEMARK OFFICE
CERTIFICATE OF CORRECTION

PATENT NO. : 4,791,588

DATED : December 13, 1988

INVENTOR(S) : Nobuhiko ONDA et al.

It is certified that error appears in the above-identified patent and that said Letters Patent is hereby corrected as shown below:

Col. 14, line 7, change "each" to --the--;

line 9, after "drive" insert --signals--;

line 30, change "possibel" to --possible--;

line 48, change "latter" to --later--.

Col. 15, line 39, change "in" to --is--;

line 41, delete "," (first occurrence).

Col. 18, line 37, delete "an";

line 39, change "NSX" to --NSC--;

line 52, change "are" to --area--;

line 53, change "$_1$54b" to --154b--;

line 60, change "insentive" to --insensitive--.

Col. 19, line 22, change "unilt" to --unit--;

line 29, change "train" to --trains--;

line 36, after "the" insert --corresponding--;

UNITED STATES PATENT AND TRADEMARK OFFICE
CERTIFICATE OF CORRECTION

PATENT NO. : 4,791,588

DATED : December 13, 1988

INVENTOR(S) : Nobuhiko ONDA et al.

It is certified that error appears in the above-identified patent and that said Letters Patent is hereby corrected as shown below:

line 38, change "respectively" to --respective--;

line 56, delete "moves";

line 62, change "disconnets" to --disconnects--.

Col. 20, line 33, change "approches" to --approaches--.

Col. 21, line 66, change "latchs" to --latches--.

Col. 22, line 6, change "pulse" to --pulses--.

Col. 23, line 3, change "appartus" to --apparatus--;

line 18, change "appar" to --appara--.

Col. 24, line 49, change "displcement" to --displacement--.

Col. 25, line 16, change "aparatus" to --apparatus--.

UNITED STATES PATENT AND TRADEMARK OFFICE
CERTIFICATE OF CORRECTION

PATENT NO. : 4,791,588

DATED : December 13, 1988

INVENTOR(S) : Nobuhiko ONDA et al.

It is certified that error appears in the above-identified patent and that said Letters Patent is hereby corrected as shown below:

Col. 26, line 1, change "predetrmined" to --predetermined--.

Signed and Sealed this

Twenty-ninth Day of August, 1989

Attest:

DONALD J. QUIGG

Attesting Officer

Commissioner of Patents and Trademarks